United States Patent [19]
Clayson et al.

[11] Patent Number: 5,879,030
[45] Date of Patent: Mar. 9, 1999

[54] FLOW LINE COUPLING

[75] Inventors: Andrew Clayson, Dundee, Scotland; Robert G. Wilkie, Melbourne, Australia

[73] Assignee: Wyman-Gordon Company, North Grafton, Mass.

[21] Appl. No.: 899,653

[22] Filed: Jul. 24, 1997

Related U.S. Application Data

[60] Provisional application No. 60/026,948, Sep. 4, 1996.

[51] Int. Cl.$^6$ ........................................ F16L 35/00
[52] U.S. Cl. ........................ 285/24; 285/93; 285/351; 285/421; 285/906; 285/917
[58] Field of Search ............................. 285/34, 35, 322, 285/323, 421, 24, 351, 906, 917, 93

[56] References Cited

U.S. PATENT DOCUMENTS

| | | | |
|---|---|---|---|
| 1,297,719 | 3/1919 | Myers | 285/322 X |
| 1,654,463 | 12/1927 | Jaques | 285/322 X |
| 2,458,874 | 1/1949 | Parker . | |
| 2,508,763 | 11/1950 | Mercier . | |
| 2,644,524 | 7/1953 | Baker . | |
| 3,284,105 | 11/1966 | Leutwyler . | |
| 3,345,084 | 10/1967 | Hanes et al. . | |
| 3,498,646 | 3/1970 | De Puy . | |
| 3,695,647 | 10/1972 | Pugliese . | |
| 3,842,914 | 10/1974 | Mott . | |
| 4,453,745 | 6/1984 | Nelson . | |
| 4,822,075 | 4/1989 | Reaux | 285/323 X |
| 5,152,556 | 10/1992 | Holland et al. . | |
| 5,156,206 | 10/1992 | Cox . | |

FOREIGN PATENT DOCUMENTS

| | | | |
|---|---|---|---|
| 1145636 | 10/1957 | France | 285/323 |
| 2437560 | 4/1980 | France . | |
| 818250 | 8/1959 | United Kingdom | 285/322 |

OTHER PUBLICATIONS

Notification of Transmittal of International Search Report dated Feb. 1, 1998 in PCT Application No. PCT/US97/15405 and International Search Report.

*Primary Examiner*—Dave W. Arola
*Attorney, Agent, or Firm*—Blodgett & Blodgett, P.C.

[57] ABSTRACT

A coupling assembly for leak proof connection of the ends of two lengths of pipe or tubing. One end of a first pipe is coupled to a coupling box which is connected to or integrally formed on the end of a second pipe. The coupling box has threads for engaging a nut for securing the coupling. The coupling box has a bore for receiving the end of the first pipe. The end of the first pipe has an outer tapered surface for engaging an inner tapered surface of the coupling box to form a metal to metal seal between the first pipe and the coupling box. The bore also contains an engager for coupling the nut to the first pipe. The engager includes a split ring which has a longitudinal slot. The split ring has internal circumferential projections or gripping teeth which are aligned with external circumferential projections or gripping teeth on the end of the first pipe. As the nut is tightened, the split ring is compressed so that the gripping teeth of the split ring are brought into engagement with the gripping teeth or the first pipe. The split ring and the first pipe are then moved relative to the coupling box so that the outer tapered surface at the end of the pipe is forced into metal to metal sealing contact with the inner tapered surface within the bore of the coupling box.

16 Claims, 19 Drawing Sheets

FLOW LINE COUPLING

CROSS-REFERENCE TO RELATED APPLICATIONS

This is a continuing application of Provisional Application No. 60/026,948 filed Sep. 4, 1996, (pending).

STATEMENT REGARDING FEDERALLY SPONSOREDRESEARCH OR DEVELOPMENT

This invention has been created without the sponsorship or funding of any federally sponsored research or development program.

BACKGROUND OF THE INVENTION

The present invention is directed to a flow line coupling assembly for joining lengths of pipe used for conveying fluids such crude oil and particularly in offshore operations.

Prior art pipeline couplings are either screw type connectors or are connector assemblies which require welding and take an extremely long time to assemble. Neither type of pipeline coupling has been acceptable for use in pipeline laying in offshore operations. The screw type connector have been unreliable in the harsh conditions of offshore operations. The other connectors take so long to make up that their use is economically prohibitive. The couplings which require welding are also limited to the use of materials which have good welding characteristics. This precludes the use of UNS 31803 and ASTM A182 F6NM, which do not weld very well but would otherwise be superior in other respects for use in pipelines. These and other difficulties experienced with the prior art flow line couplings have been obviated by the present invention.

It is, therefore, a principle object of the invention to provide a flow line coupling which can be coupled in a very short time.

A further object of the insertion is the provision of a flow line coupling which is not limited to the use of materials which have good welding characteristics.

Another object of the present invention is to provide a flow line coupling which provides a good metal to metal seal and is reliable for an extended period of use.

With these and other objects in view, as will be apparent to those skilled in the art, the invention resides in the combination of parts set forth in the specification and covered by the claims appended hereto.

BRIEF SUMMARY OF THE INVENTION

The present invention is a coupling assembly for leak proof connection of the ends of two lengths of pipe or tubing. One end of a first pipe is coupled to a coupling box which is integrally formed on the end of a second pipe. The coupling box can also be a separate unit which is connected to the ends of both pipes. The coupling box has threads for engaging a nut for securing the coupling. The coupling box has a bore for receiving the end of the first pipe. The bore also contains an engager for operatively coupling the nut to the first pipe. The engager includes a split ring which has a longitudinal slot. The split ring has internal circumferential projections or gripping teeth which are aligned with external circumferential projections or gripping teeth on the end of the first pipe. As the nut as the nut is tightened, the split ring is compressed so that the gripping teeth of the split ring are brought into engagement with the gripping teeth of the first pipe. The split ring and the first pipe are then moved relative to the coupling box so that an outer tapered surface at the end of the pipe is forced into a metal to metal sealing contact with an inner tapered surface within the bore of the coupling box.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
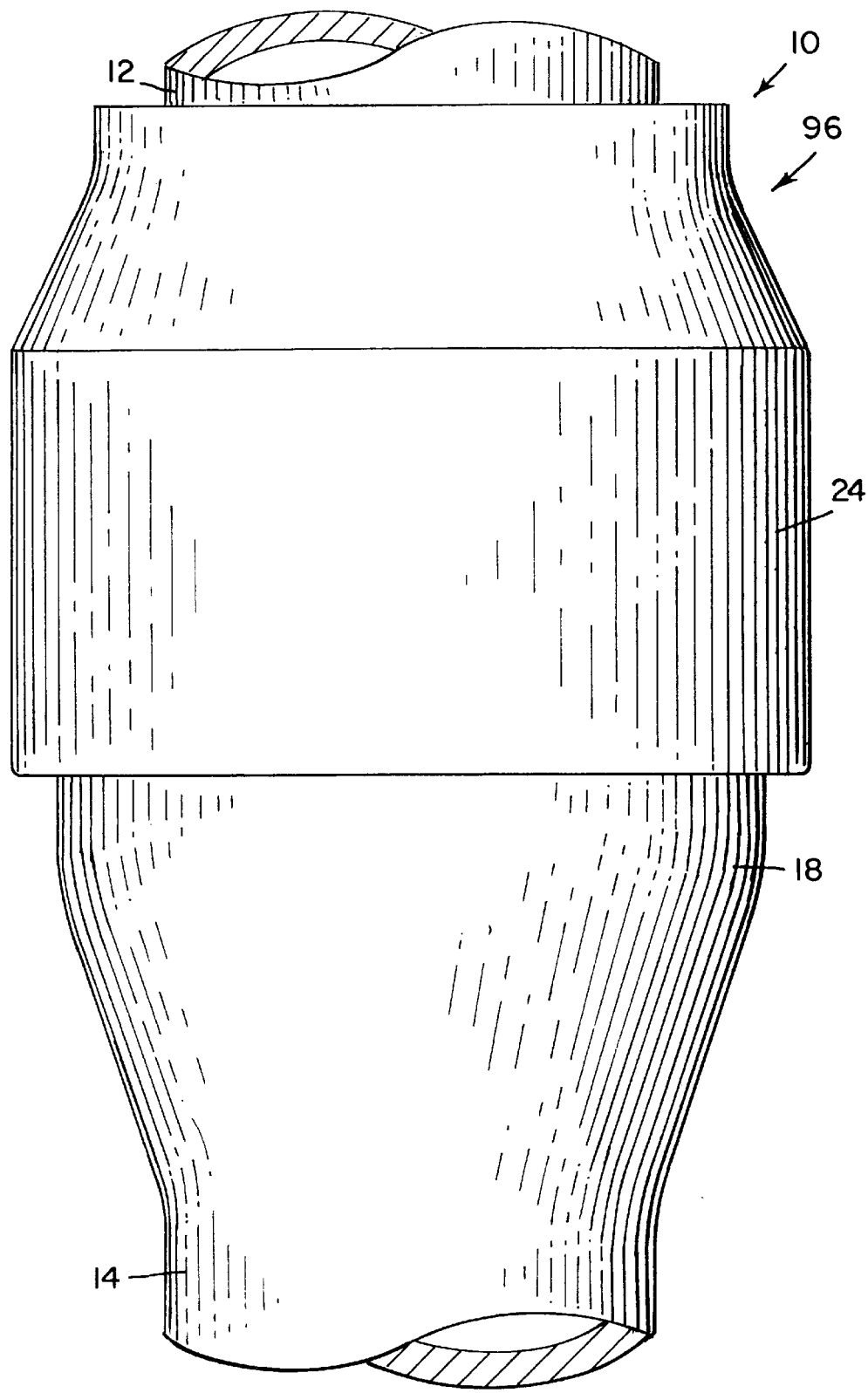
FIG. 1 is a side elevational view of a first embodiment of a flow line coupling embodying the principles of the present invention.
Figure 2:
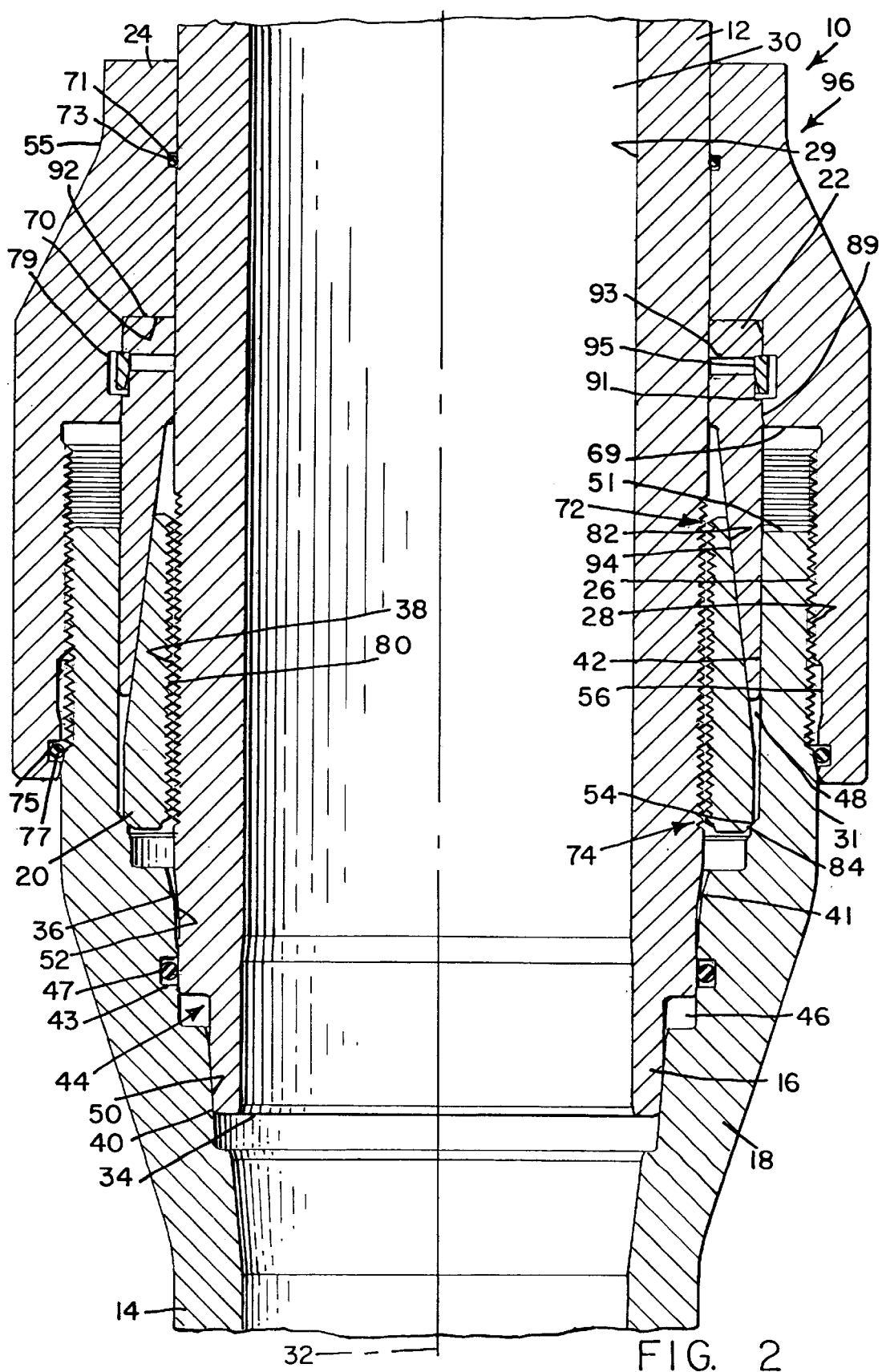
FIG. 2 is a vertical cross-sectional view of the flow line coupling of FIG. 1 prior to the tightening of the nut.
Figure 3:
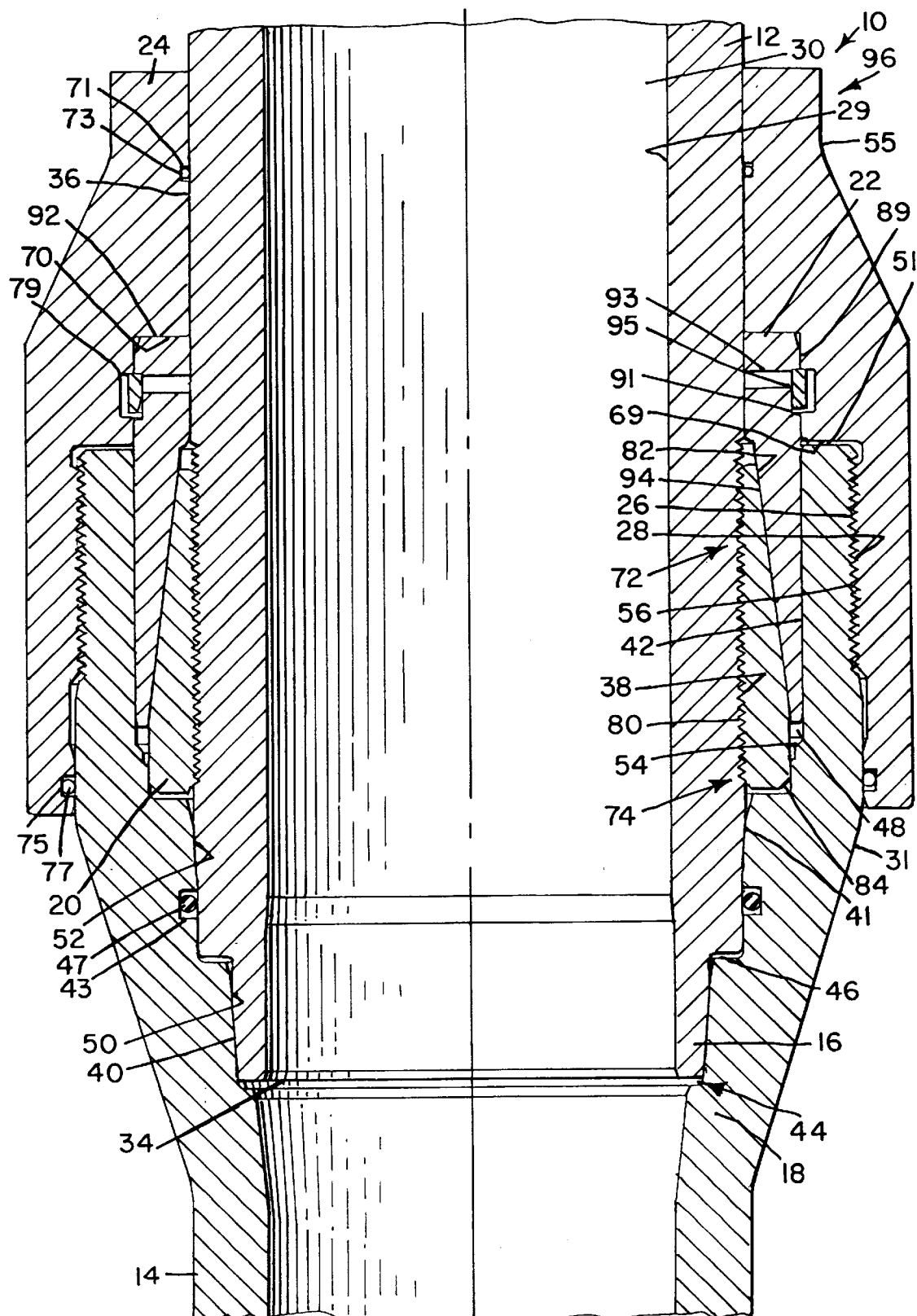
FIG. 3 is a vertical cross-sectional view of the low line coupling of FIG. 1 after tightening of the nut.

Referring first to FIGS. 1—3, a first embodiment of a flow line coupling embodying the principles of the present invention is generally indicated by the reference numeral 10 and is shown operatively connecting an upper pipe 12 to a lower pipe 14. The flow line coupling 10 includes a "pin" 16 at the lower end of the upper pipe 12 and which is integral part of the pipe. The outer surface of the pin 16 has a profile which is formed, as for example, by machining. The flow line coupling 10 also includes a coupling box 18 at the upper end of the pipe 14 and which is integral with the pipe 14. The inner surface of the coupling box 18 has a profile which is complementary with the outer profile of the pin 16 and is formed, as for example, by machining. The flow line coupling 10 includes an engager in the form of a split ring 20 and an actuating ring 22 which are located between the pin 16 and the coupling box. The flow line coupling 10 also includes a nut 24 which is located externally of the coupling box 18. The nut 24 has internal threads 26 for engaging external threads 28 of the coupling box for enabling the nut 24 to be tightened on the coupling box for forming a tight seal between the pin 16 and the coupling box 18 in a manner to be described hereinbelow.

Figure 4:
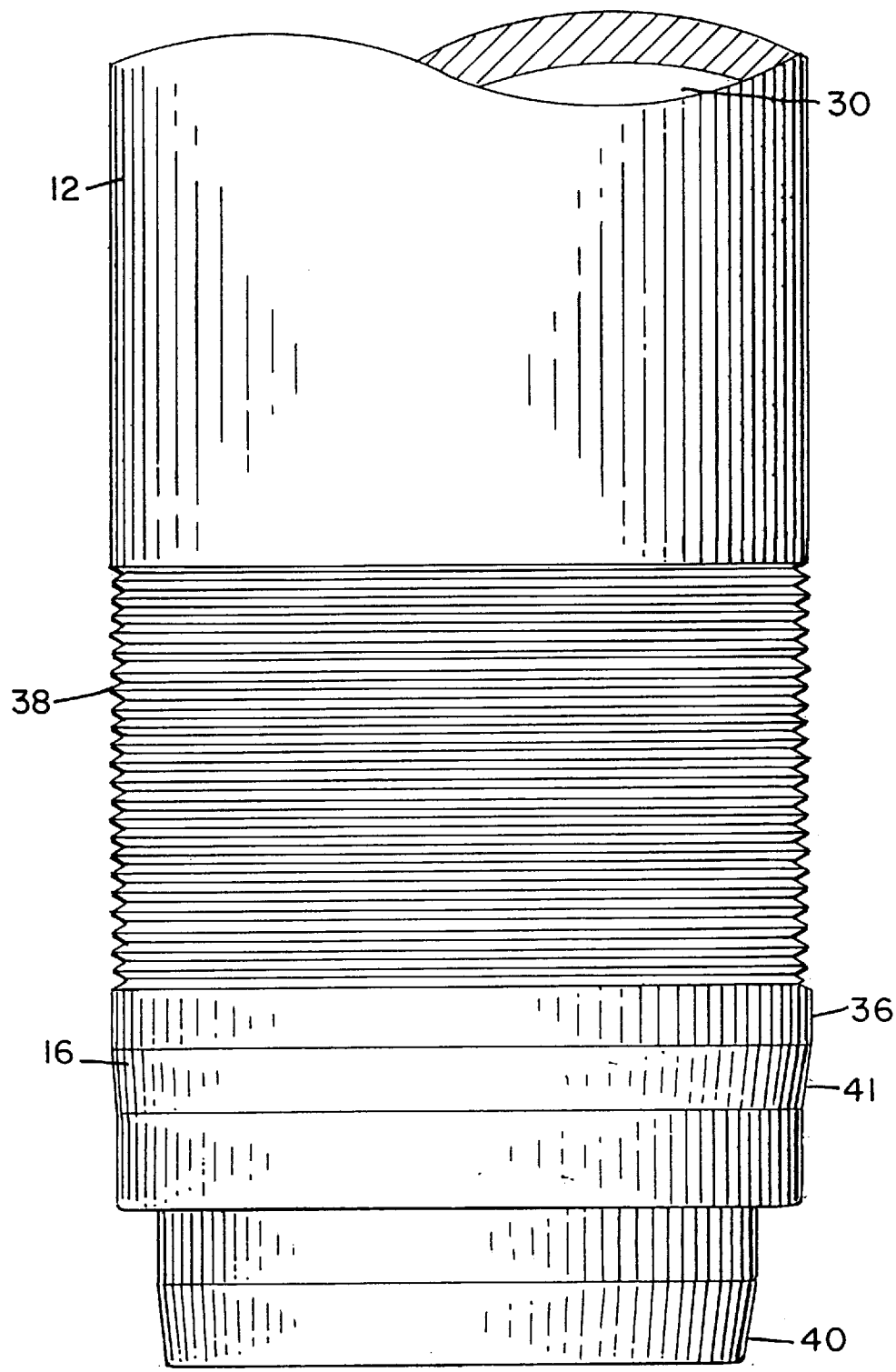
FIG. 4 is a side elevational view of a first pipe which forms part of the flow line coupling.
Figure 5:
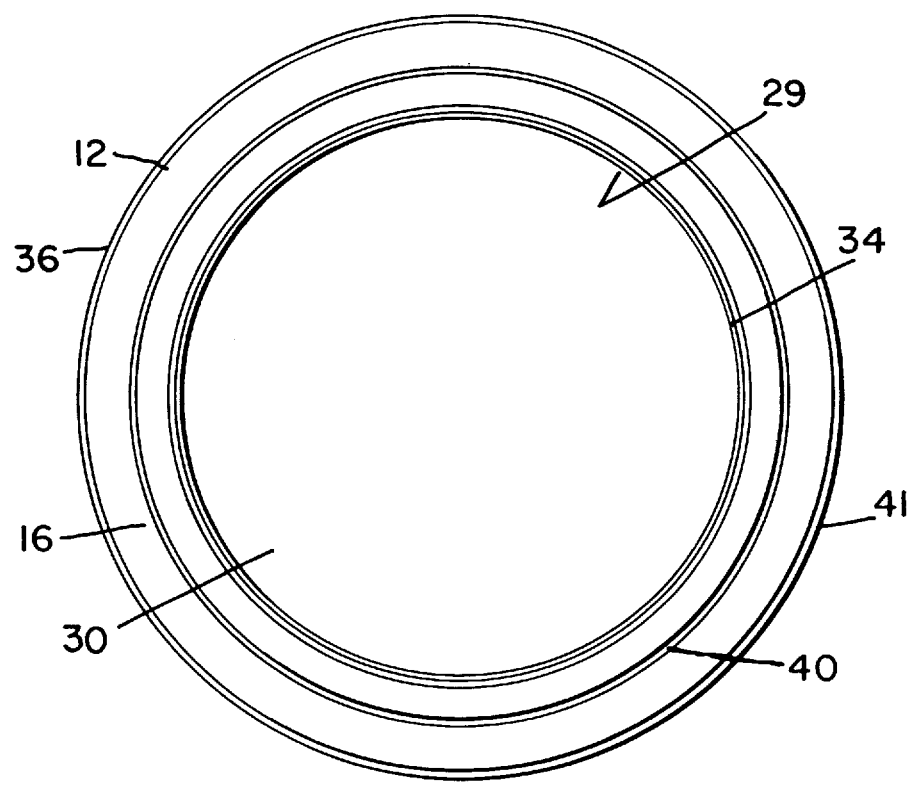
FIG. 5 is a bottom plan view of the pipe of FIG. 4.

The elements which make up the coupling box 10 are shown in FIGS. 4–17. Referring first to FIGS. 2, 4 and 5, the pin 16 has a first inner surface 29 and a first vertical cylindrical outer surface 36 which is concentric about the central longitudinal axis 32 of the pipe 12. The first inner surface 29 defines a first cylindrical bore 30 which has a bottom opening 34. The first outer surface 36 has a plurality of circumferential projections or outwardly facing gripping teeth 38 spaced from the bottom opening 34. Surface 36 has a first primary tapered portion 40 adjacent the bottom opening 34 and a first secondary tapered portion 41 between the first primary tapered portion 40 and the gripping teeth 38. The first primary tapered portion 40 is substantially closer to the central longitudinal axis 32 than the first secondary tapered portion 41. Each tapered portion 40 and 41 tapers inwardly toward the bottom opening 34.

Figure 6:
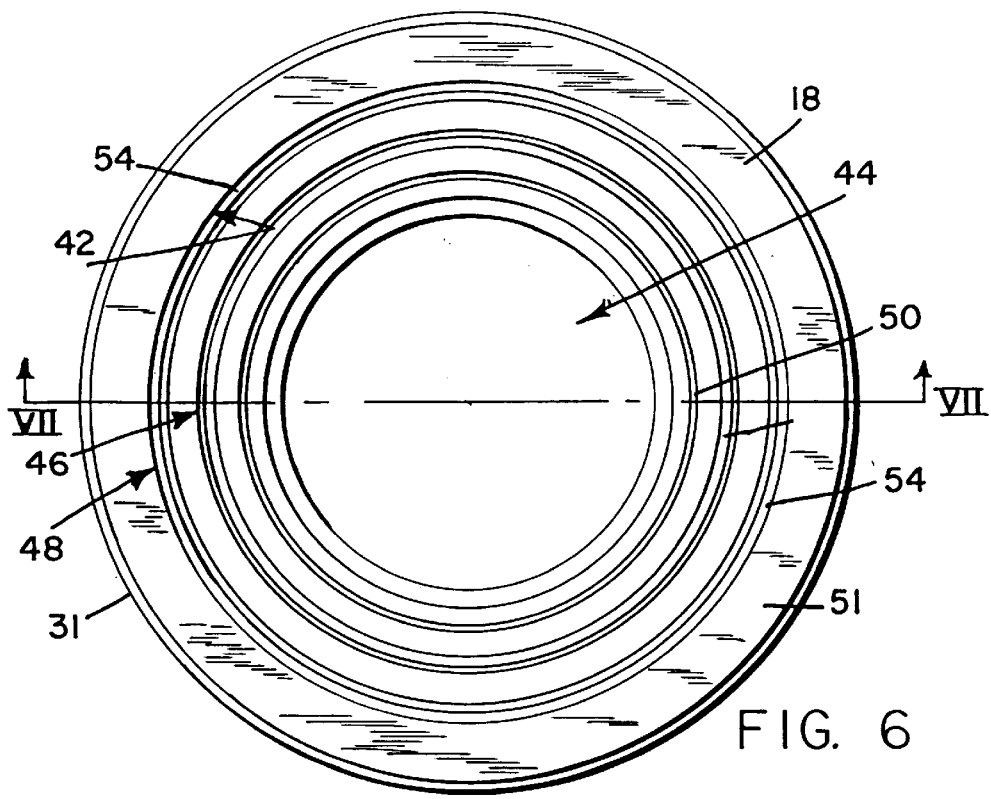
FIG. 6 is a top plan view of a coupling box which is operatively connected to a second pipe of the flow line coupling.
Figure 7:
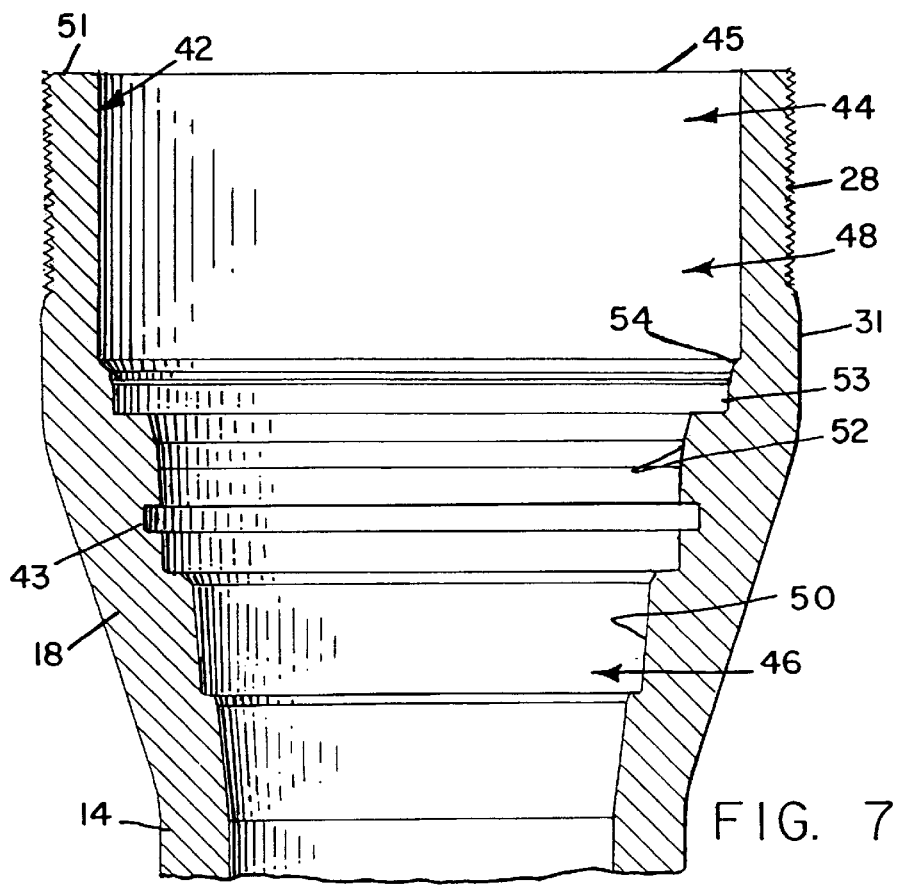
FIG. 7 is a vertical cross-sectional view of the coupling box taken along the line VI—VI of FIG. 5 and looking in the direction of the arrows.
Figure 8:
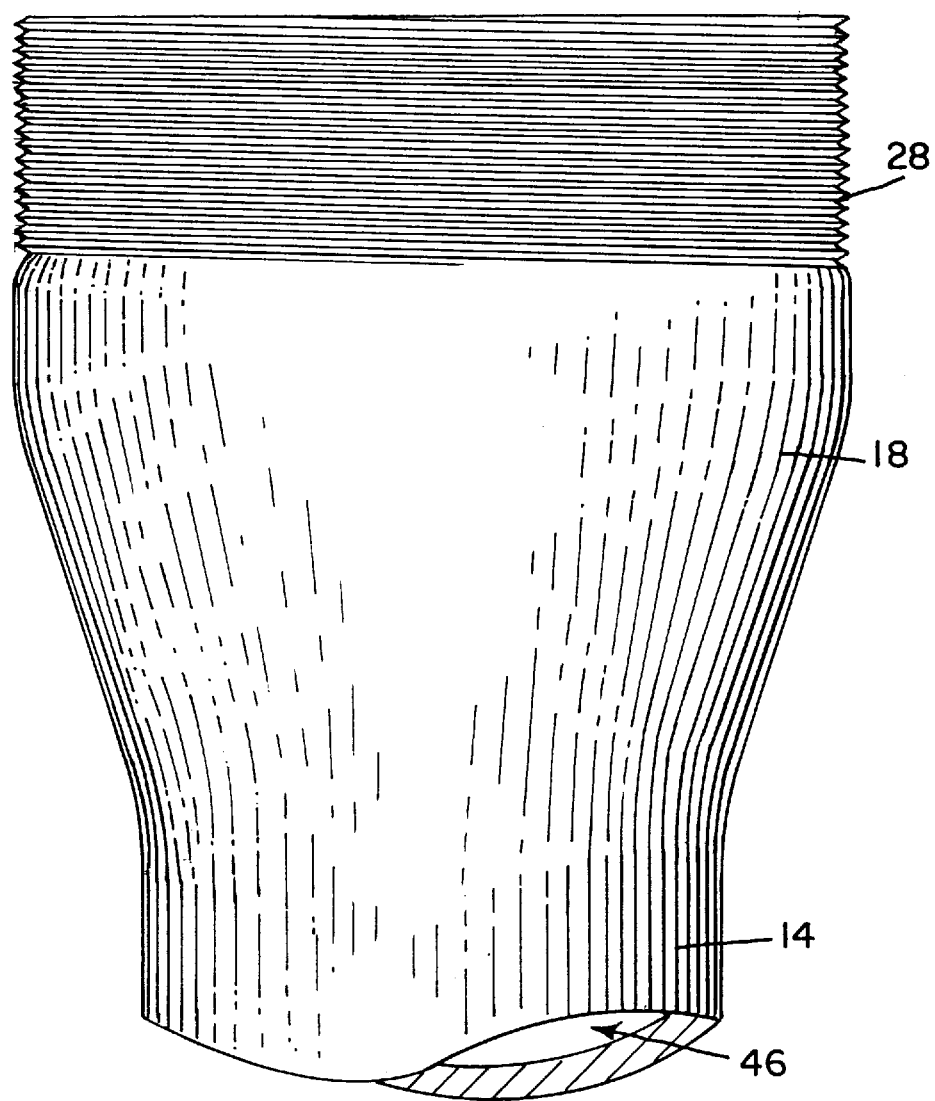
FIG. 8 is a side elevational view of the coupling box.

Referring specifically to FIGS. 6–8, the coupling box 18 has a second outer surface 31 which contains the external threads 28. The coupling box 18 has a second annular inner surface, generally indicated by the reference numeral 42, which defines a second annular bore, generally indicated by the reference numeral 44, which has a top opening 45. The bore 44 has a small diameter portion, generally indicated by the reference numeral 46, which is substantially spaced from the top opening 45 and a large diameter portion, generally indicated by the reference numeral 48, adjacent the top opening 45. The second inner surface 42 has a second primary tapered portion 50 at the small diameter portion 46 of the bore 44 and a second secondary tapered portion 52 between the second primary tapered portion 50 and the top opening 45. The tapered portions 50 and 52 taper outwardly toward the top opening 45. The second inner surface 42 of the coupling box has an upwardly and inwardly facing annular cam surface 54 at the lower end of the large diameter bore portion 48 and above the second secondary tapered portion 52 of the coupling box. The lower end of the large diameter bore portion 48 has a narrowed section 53 just below the cam surface 54. The second inner surface 42 also has an annular groove 43 for receiving an annular elastomeric sealing ring 47, see FIGS. 2 and 3. The coupling box 18 has an annular upper edge surface 51.

Figure 15:
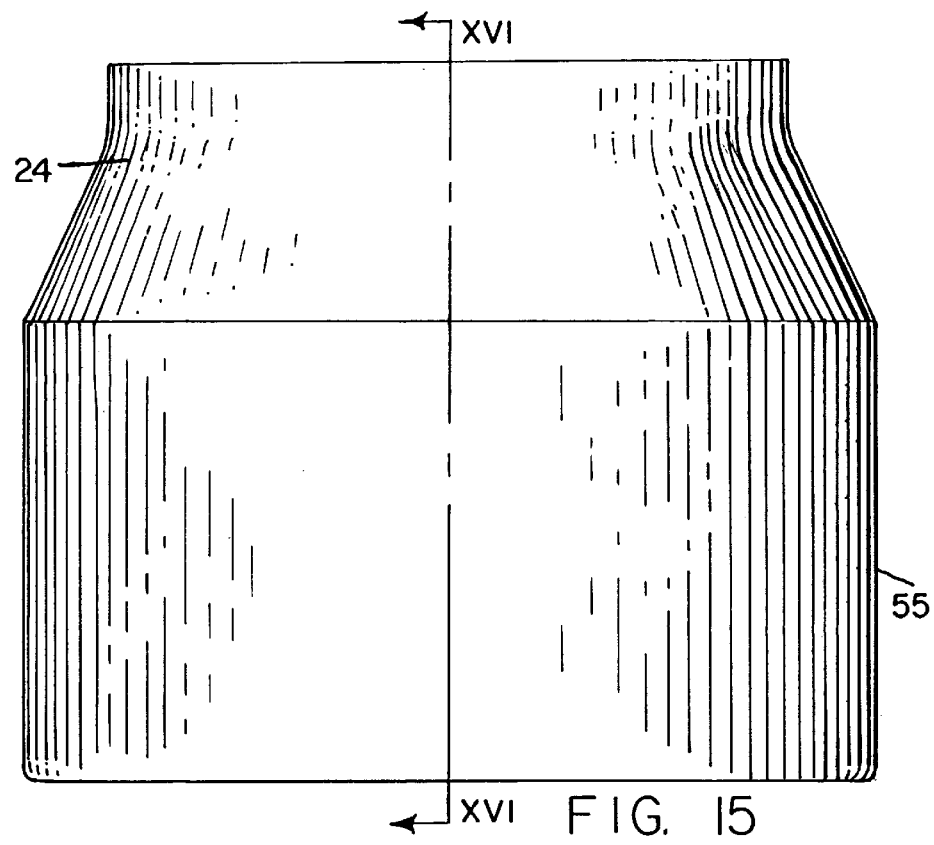
FIG. 15 is a side elevational view of a nut which forms part of the flow line coupling of FIG. 1.
Figure 16:
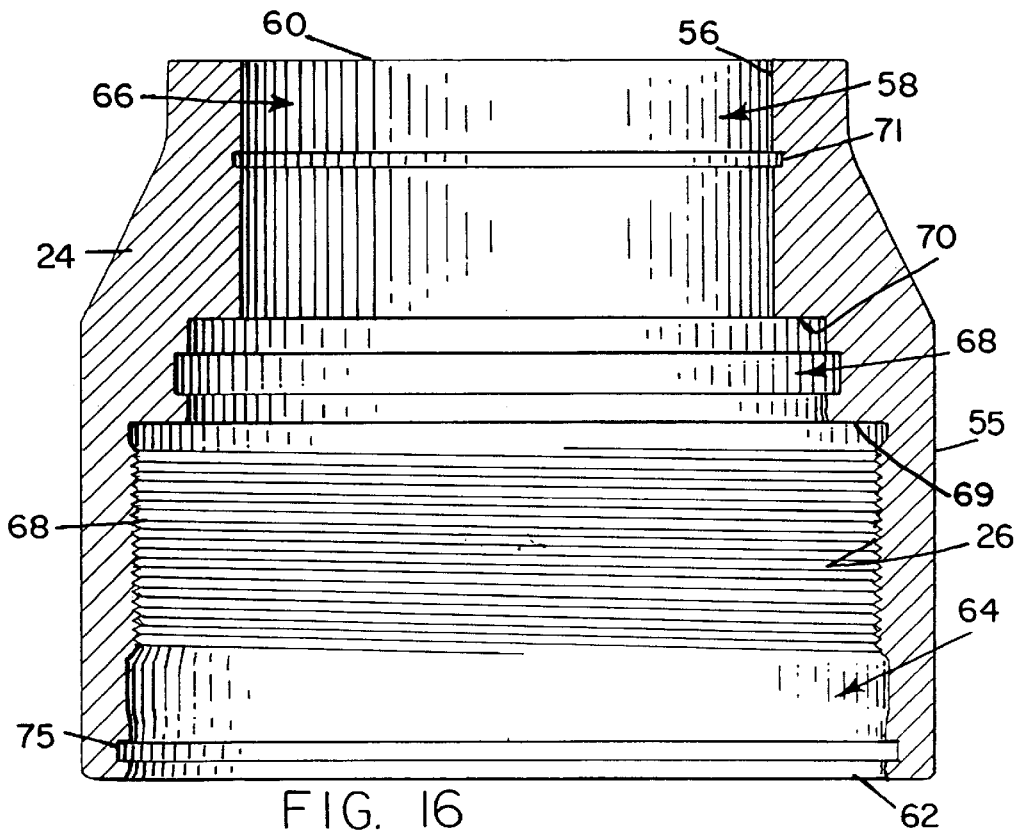
FIG. 16 is a vertical cross-sectional view of the nut of FIG. 15 taken along the line XVI—XVI of FIG. 15 and looking in the direction of the arrows.
Figure 17:
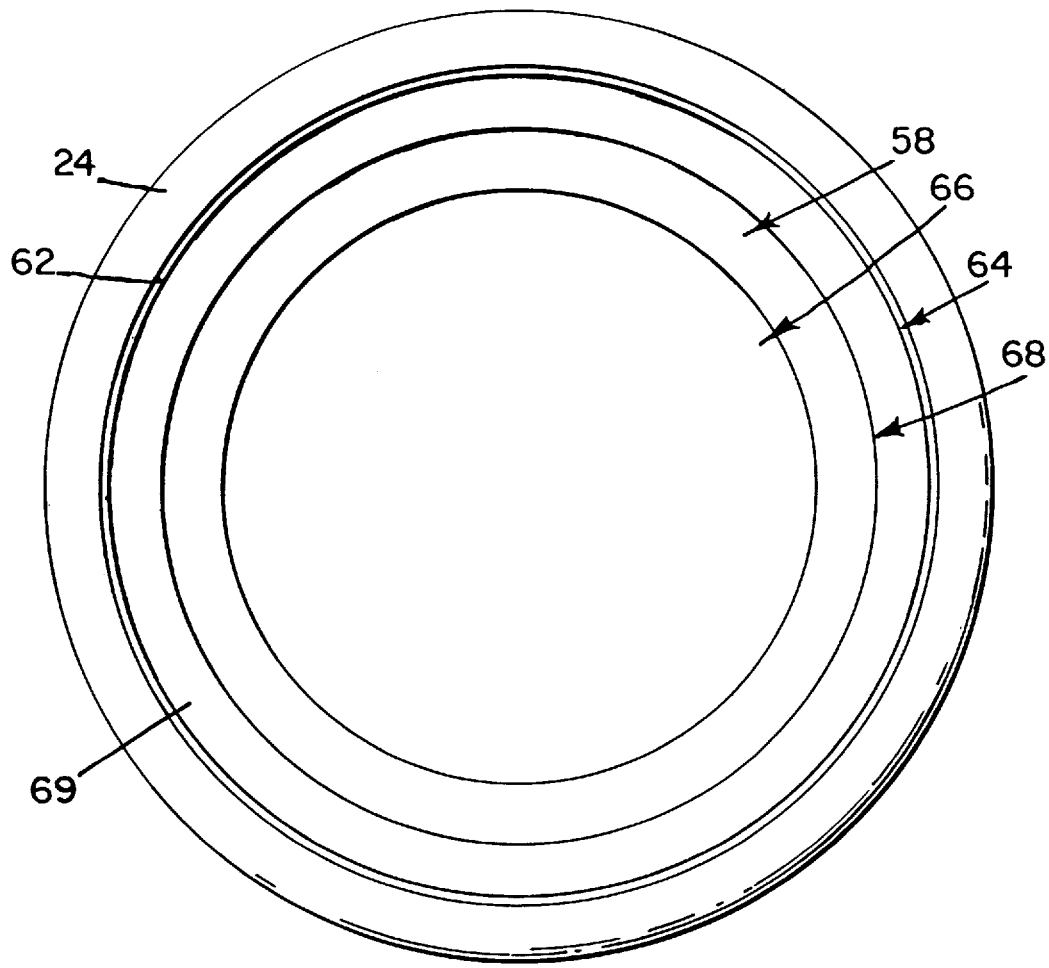
FIG. 17 is a bottom plan view of the nut of FIG. 15.

Referring specifically to FIGS. 15–17, the nut 24 has a vertical third outer surface 55 and a vertical third inner surface 56. The third inner surface 56 defines a third circular bore 60 which has an upper opening 58 and a lower opening 62. The bore 58 has a large diameter portion, generally indicated by the reference numeral 64, adjacent the lower opening 62, a small diameter portion, generally indicated by the reference numeral 66, adjacent the upper opening 60 and an intermediate diameter portion, generally indicated by the reference numeral 68, located between the small diameter portion 66 and the large diameter portion 64. A downwardly facing annular surface 70 is located between the small diameter portion 66 and the intermediate diameter portion 68 of the bore 58. The upper end of the third inner surface 56 has an annular groove 71 for receiving an annular elastomeric sealing ring 73, see FIGS. 2 and 3. The lower end of the inner surface 56 has an annular groove 75 for receiving an elastomeric sealing ring 75. A central portion of the inner surface 56 has an annular groove 79 for a purpose to be described. The third inner surface 56 at the large diameter bore portion 64 has the internal threads 26. The nut 24 has a downwardly facing annular surface or shoulder 69 just above the threads 26.

Figure 9:
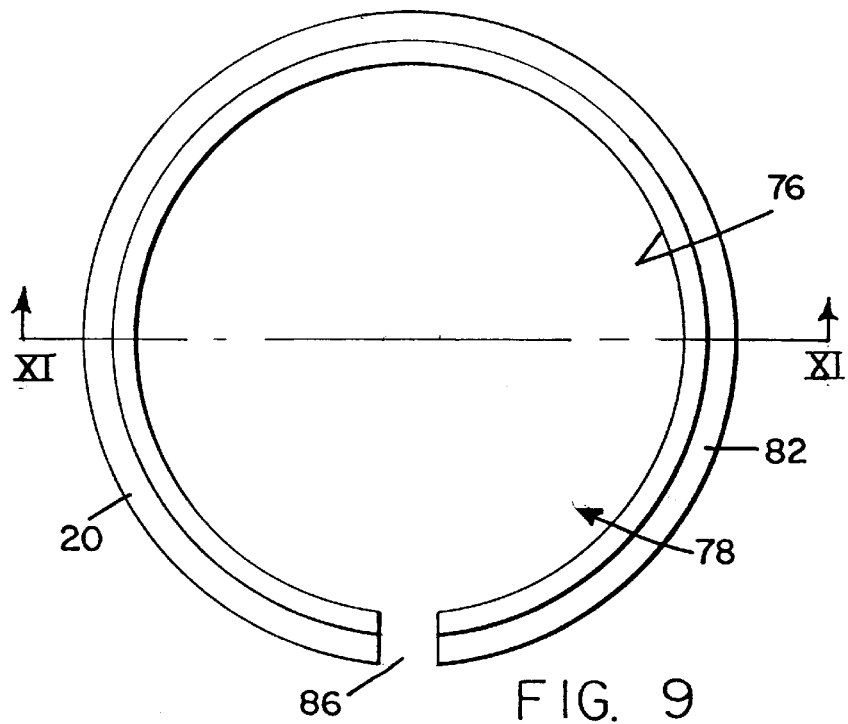
FIG. 9 is a top plan view of a split ring which forms part of the flow line coupling of FIG. 1.
Figure 10:
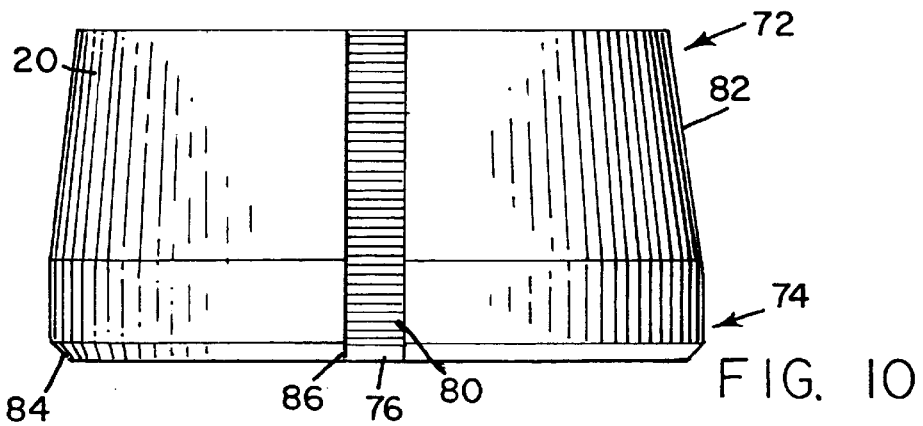
FIG. 10 is a side elevational view of the split ring of FIG. 9.
Figure 11:
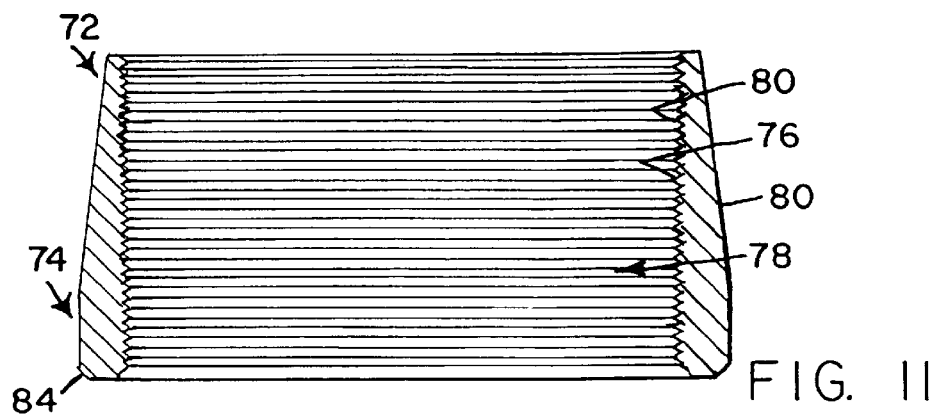
FIG. 11 is a vertical cross-sectional view of the split ring taken along the line XI—XI of FIG. 9 and looking in the direction of the arrows.

Referring specifically to FIGS. 9–11, the split ring 20 has an upper end, generally indicated by the reference numeral 72, and a lower end, generally indicated by the reference numeral 74. The split ring 20 has a vertical fourth inner surface 76 which define a fourth bore, generally indicated by the reference numeral 78. The fourth inner surface 76 has a plurality of circumferential projections or inwardly facing griping teeth 80. The split ring 20 has an annular outer engaging surface 82 which tapers inwardly toward the upper end of the ring 20. The lower end 74 of the split ring 20 has an outwardly and downwardly facing annular cam surface 84. A vertical slot 86 extends all the way through the split ring 20. The split ring 20 is made of a metal which is sufficiently resiliently flexible to enable the split ring to be constricted so that its diameter is reduced upon application of sufficient external force to the outer engaging surface 82 of the split ring.

Figure 12:
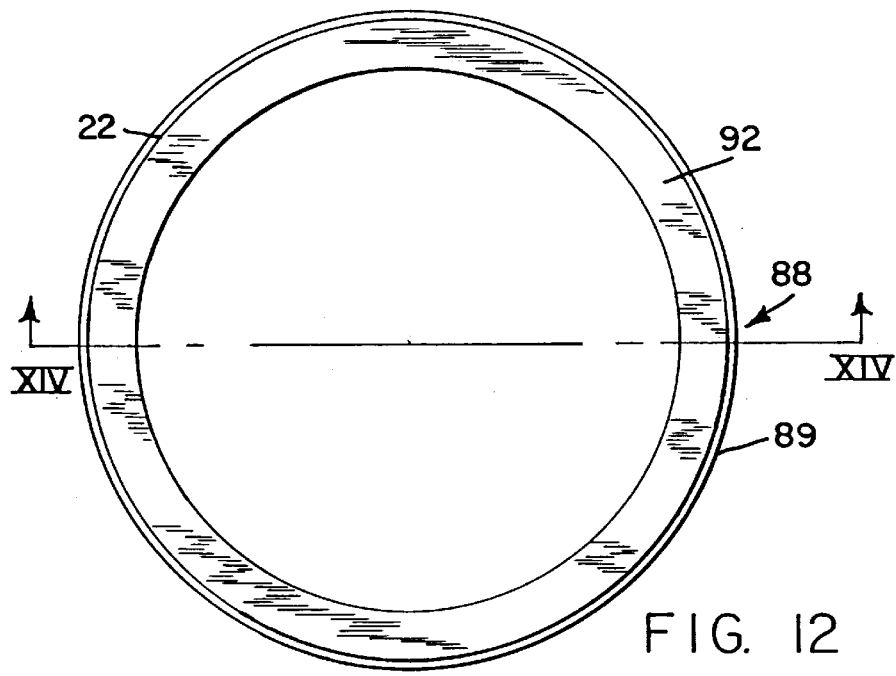
FIG. 12 is a top plan view of an actuating ring which forms part of the flow line coupling of FIG. 1.
Figure 13:
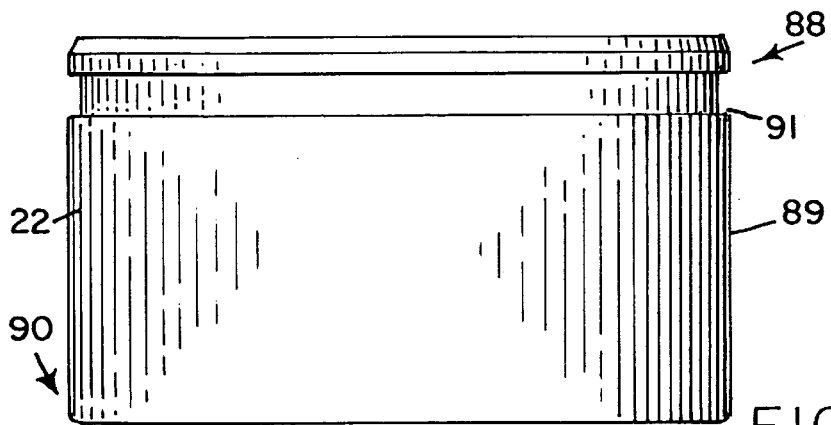
FIG. 13 is a side elevational view of the actuating ring.
Figure 14:
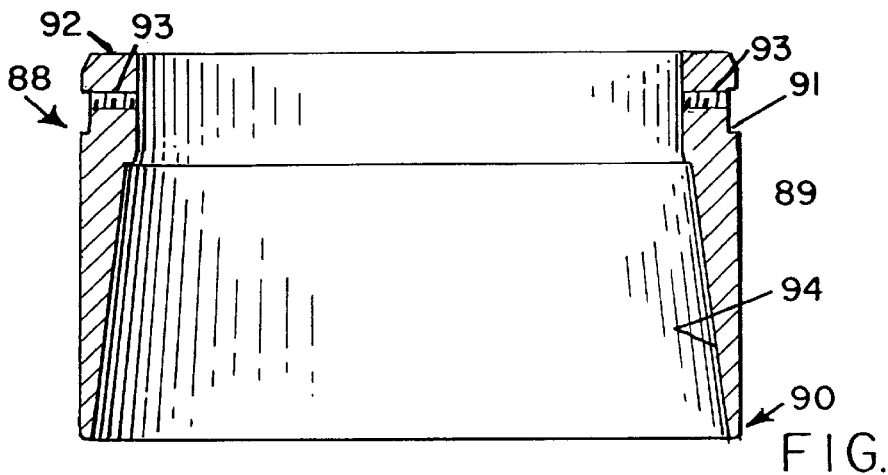
FIG. 14 is a vertical cross-sectional view of the actuating ring, taken along the line XIV—XIV of FIG. 9 and looking in the direction of the arrows.

Referring specifically to FIGS. 12–14, the actuating ring 22 has an upper end, generally indicated by the reference numeral 88, and a lower end, generally indicated by the reference numeral 90. The actuating ring 22 has an upwardly facing end surface 92 and an annular inwardly facing engaging surface 94 adjacent the lower end of the actuating ring 22. The engaging surface 94 tapers outwardly toward the lower end 90 of the actuating ring 22. The actuating ring 22 has an outer surface 89 which contains an annular groove 91 near the upper end of the actuating ring. A plurality of threaded horizontal bores 93 extend from the groove 91 entirely through the actuating ring 22.

Figure 18:
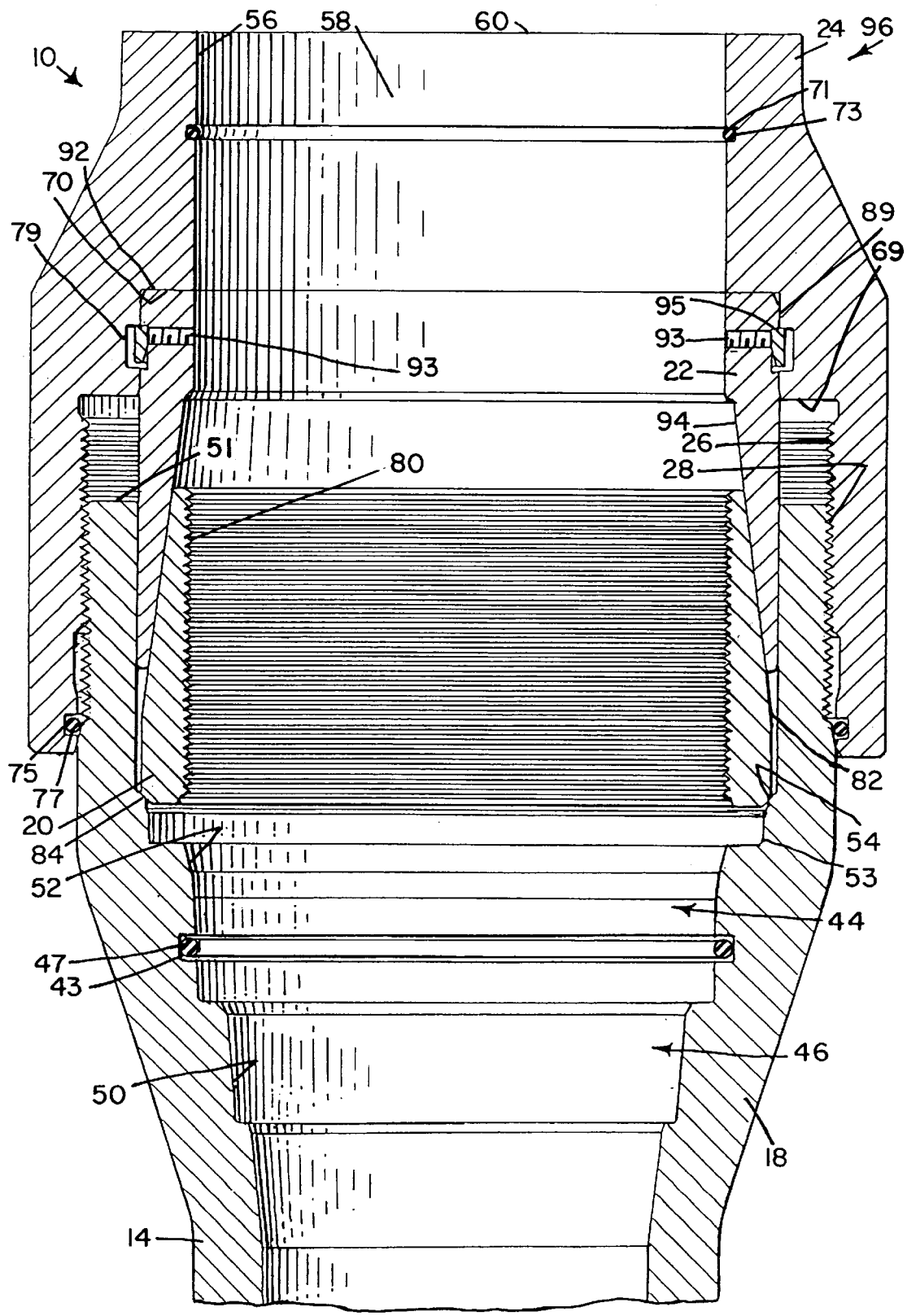
FIG. 18 is a vertical cross-sectional view of coupling box, split ring, actuating ring; and nut assembled to form a coupling box assembly.

Referring specifically to FIG. 18, the flow line coupling 10 of the present invention is assembled by first positioning the split ring 20 within the bore of the coupling box 18 so that the outwardly facing cam surface 84 of the split ring rests against the inwardly facing cam surface 54 of the coupling box. The actuating ring 22 is applied to the upper end of the load ring 20 so that the lower end of the actuating ring is positioned between the split ring and the inner surface of the coupling box, wherein the inwardly facing engaging surface 94 of the actuating ring 22 engages the outwardly facing engaging surface 82 of the split ring 20. A snap ring 95 is positioned in the annular groove 91 of the actuating ring 22. The nut 24 is threaded onto the upper end of the coupling box 18 by means of the threads 26 and 28 until the downwardly facing surface 70 of the nut 24 engages the upwardly facing end surface 92 of the actuating ring 22 as shown in FIG. 18. At this point, the annular groove 79 is horizontally aligned with the annular groove 91 so that a portion of the snap ring 95 is also located in the groove 91. When all of the elements 20, 22, 24, and 18 of the coupling box are assembled as shown in FIG. 18, they define a coupling box assembly, generally indicated by the reference numeral 96. At this point, the nut 24 is in its upper loosening position and the coupling box assembly 96 is ready to receive the lower end of the pipe 12, i.e., the pin 16. The pin 16 is inserted into the third circular bore of the nut 24 and through the rings 20 and 22 so that the lower end of the pin lies within the small diameter portion 46 of the coupling box as shown in FIG. 2. The nut 24 is tightened on the coupling box 18, to move the nut downwardly relative to the coupling box 18 from its upper loosening position shown in FIG. 2 to its lower tightening position shown in FIG. 3. The actuating ring 22 is forced downwardly by the downwardly facing annular surface 70 of the nut 24. The actuating ring 22, in turn, forces the split ring 20 slightly downwardly and inwardly due to the wedging action between the tapered surfaces 82 and 94. The annular cam surface 54 provides resistance against downward movement of the split ring 20 and enables the split ring to be constricted by the actuating ring 22. This causes the inwardly facing griping teeth 80 to move inwardly into gripping engagement with the outwardly facing gripping teeth 38 of the pin 16. Subsequent tightening of the nut 24 causes the rings 20 and 22 to move downwardly an additional amount and also causes the pin 16 to move downwardly due to the locking engagement between the gripping surfaces 80 and 38. The narrowed section 53 of the large diameter bore portion 48 insures that the gripping teeth 38 and 80 remain in engagement during the downward movement of the split ring 20. Eventually the annular tapered portions 40 and 41 of the pin 16 engage the annular tapered portions 50 and 52, respectively, of the inner surface of the coupling box 18 to form a metal to metal double seal between the pin 16 of the pipe 12 and the coupling box 18 which forms the upper portion of the pipe 14. At this point, the shoulder 69 of the nut is close to the upper end surface 51 of the coupling box to prevent the nut from being tightened any further than what is required to achieve a metal to metal seal between the pin 16 and the coupling box 18.

The flow line coupling 10 of the present invention is uncoupled by reversing the assembling procedure described above. When the nut 24 is unthreaded so that the nut moves upwardly relative to the coupling box 18, the actuating ring 22 is also drawn upwardly through the interengagement of the nut 24 and actuating ring 22 with the snap ring 95. The upward movement of the actuating ring 22 causes the actuating ring to disengage from its wedging action with the split ring 20. This enables the split ring to return to its normal open position, as shown in FIG. 2, wherein the inwardly facing gripping teeth 80 to move out of engagement with the outwardly facing gripping teeth 38 of the pin 16. The pin 16 can then be removed from the coupling box assembly 96. The time required to make the coupling will be substantially less than 10 minutes and, realistically within 6–8 minutes. Additional time may be required where back pressurization of the sealing areas is required by a customer. Back pressurization for testing for treating the effectiveness of the metal to metal seal between the pin 151 and the coupling box 152 is provided by drilling ports into the coupling box to accommodate the required pressure fittings, see for example, pressure fittings 122 in the coupling box of the second embodiment of the invention shown in FIGS. 19–22. It is likely that, with the use of quick connect hose couplings, the pressure testing could be completed in 2–3 minutes.

In the embodiment of the invention described above, the coupling box is an integral part of the lower pipe 14. The coupling box can be a separate double ended unit, wherein the lower end of the coupling box is identical to the upper end of the coupling box for interacting with the upper end of a lower pipe which has an integral pin that is comparable to pin 16 of the pipe 12. A second set of rings 20 and 24 and a nut 24 are also employed in interactive fashion with the lower end of the coupling box and the pin which is an integral part of the lower pipe.

Figure 19:
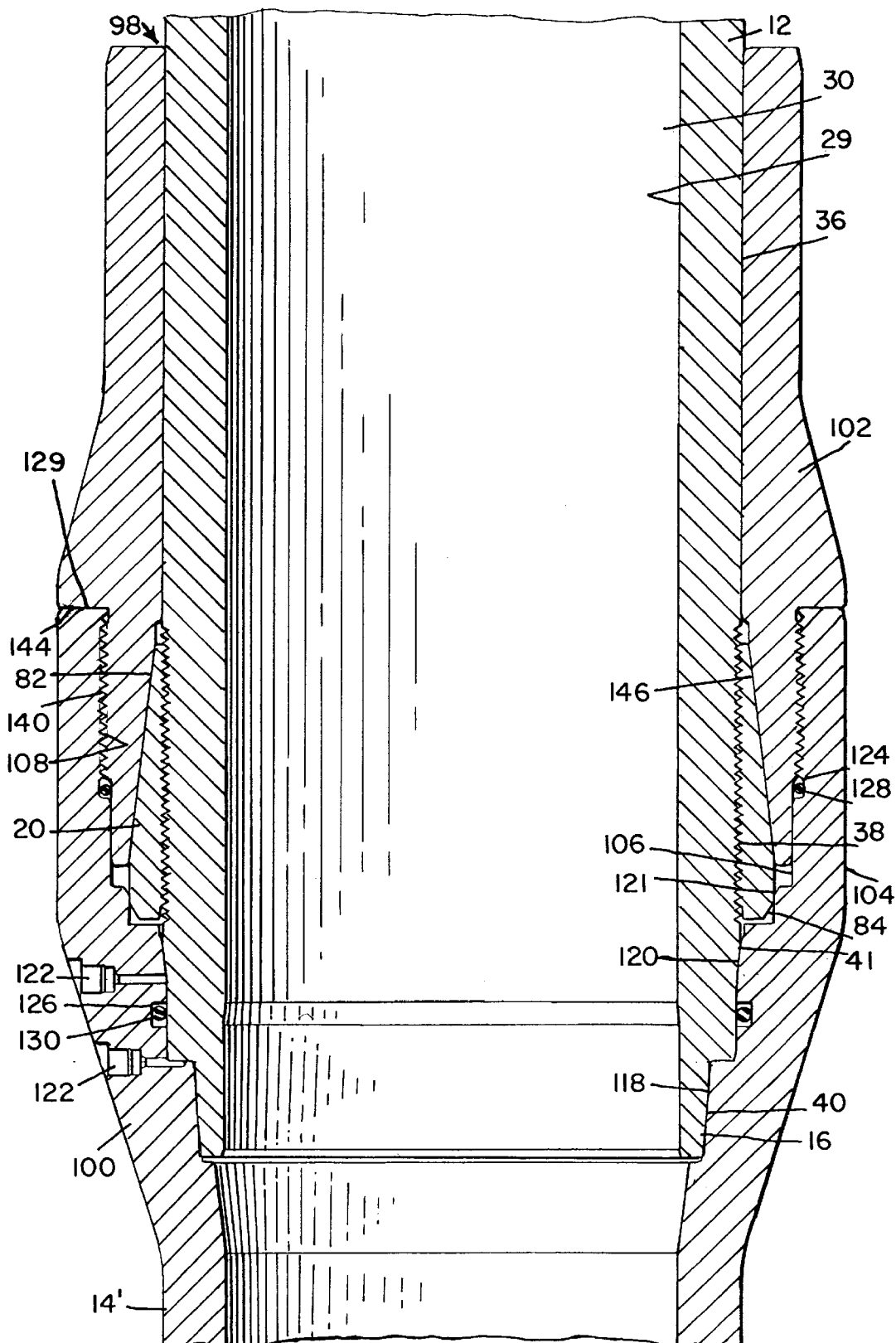
FIG. 19 is a vertical cross-sectional view of a second embodiment of a flow line coupling.
Figure 20:
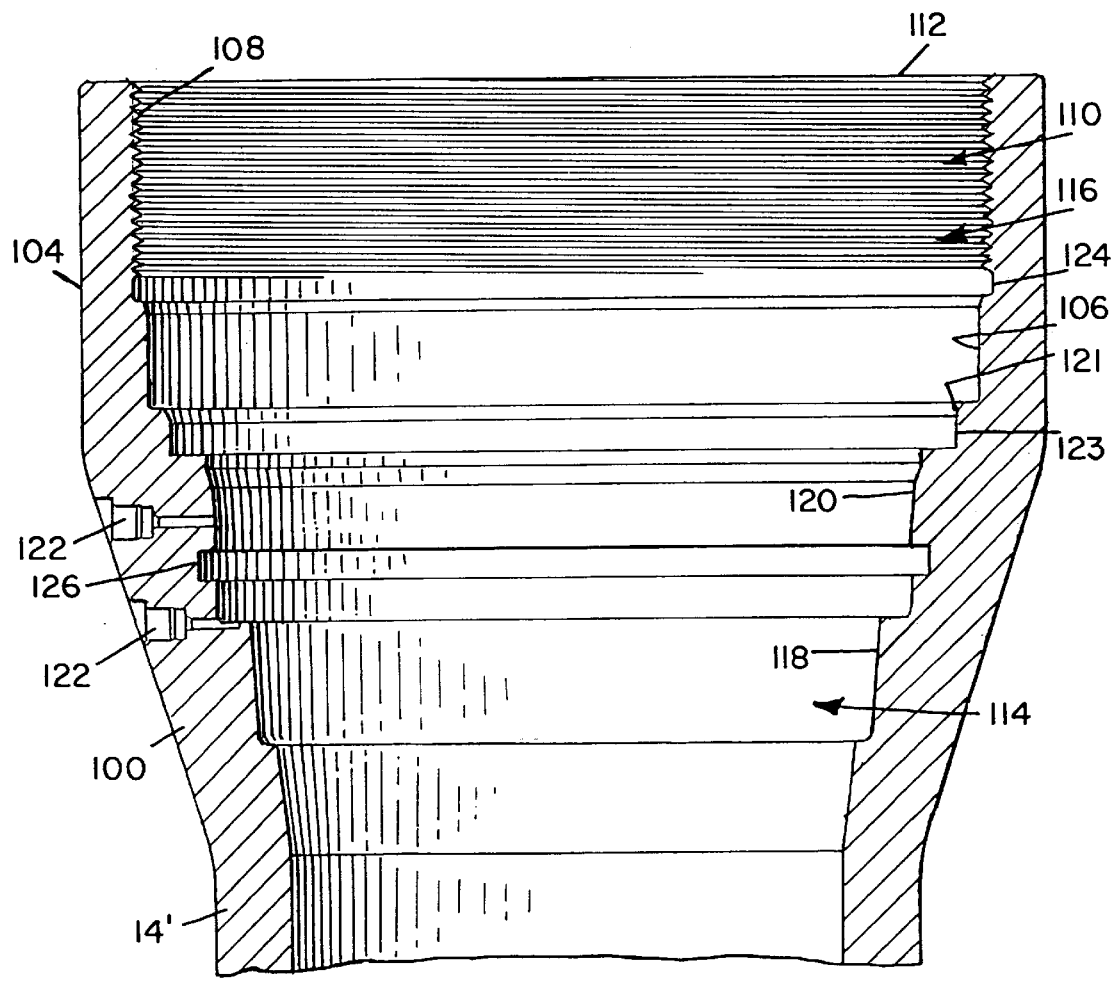
FIG. 20 is a vertical cross-sectional view of the coupling box portion of the flow line coupling of FIG. 18.
Figure 21:
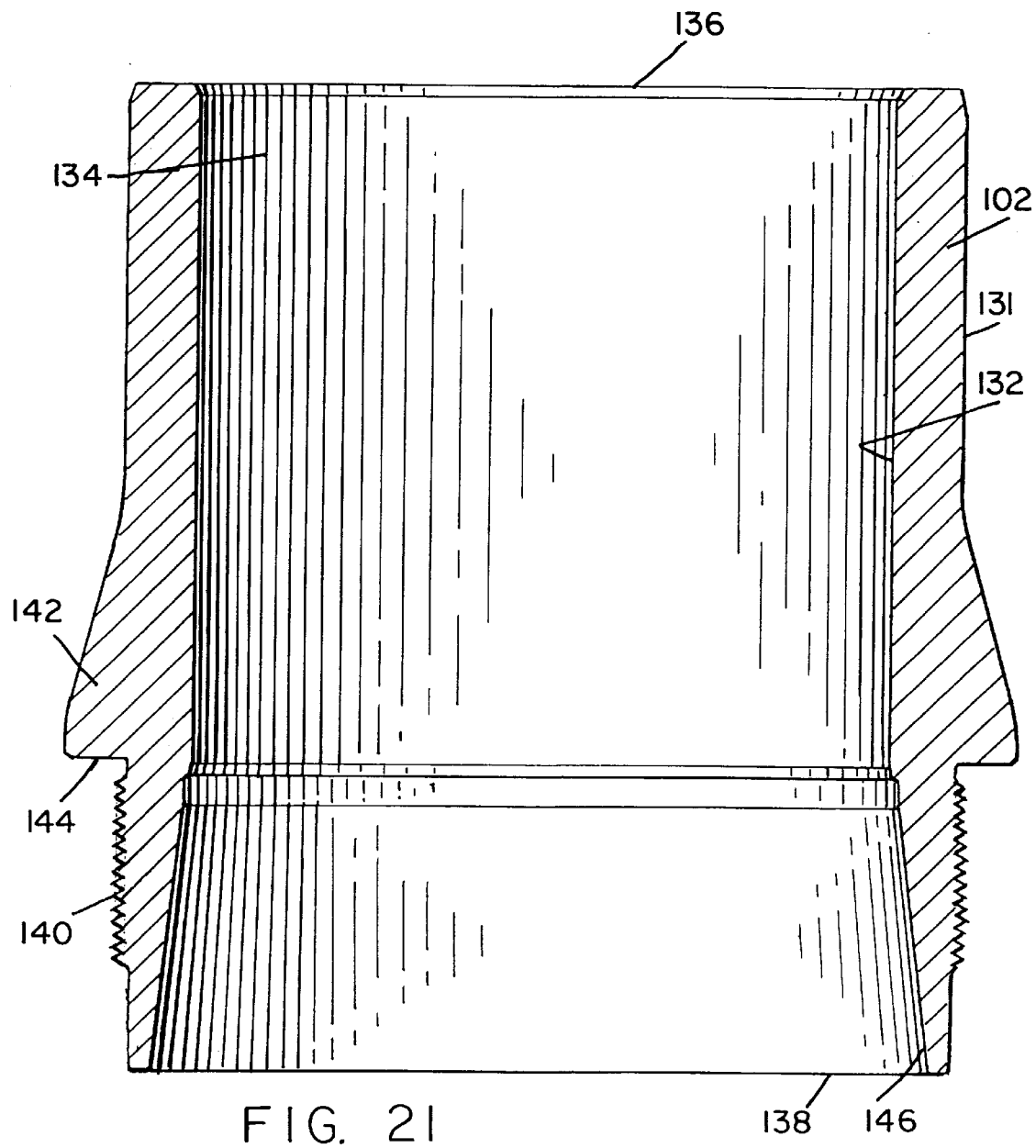
FIG. 21 is a vertical cross-sectional view of the nut portion of the flow line coupling of FIG. 18.

Referring to FIGS. 19–21, there is shown a second embodiment of a flow line coupling, generally indicated by the reference numeral 98, and is shown operatively connected to the upper pipe 12 which includes the pin 16. The flow line coupling 98 includes a coupling box 100 which is integrally connected to the upper end of a lower pipe 14'. The flow line coupling 89 also includes the split ring 20 which forms part of the flow line coupling embodiment 10.

Referring specifically to FIGS. 19 and 20, the coupling box 100 has a second outer surface 104 and a second inner surface 106. The second inner surface 106 defines a second annular bore, generally indicated by the reference numeral 110, which has a top opening 112. The bore 110 has a small diameter portion, generally indicated by the reference numeral 114, near the lower pipe 14' and a large diameter portion, generally indicated by the reference numeral 116 adjacent the top opening 112. The second inner surface 106 has internal threads 108 at the large diameter lower portion 116. The second inner surface 106 has a second primary tapered portion 118 at the small diameter portion 114 of a second bore 110 and a second secondary tapered portion 120 between the threads 108 and the primary tapered portion 118. The tapered portions 118 and 120 taper outwardly toward the top opening 112. The second inner surface 106 of the coupling box 100 has upwardly and inwardly facing annular cam surface 121 at the lower end of the large diameter portion 116 and above the second secondary tapered portion 120 of the coupling box 100. The lower end of the large diameter bore portion 116 has a narrowed section 123 just below the cam surface 121. The second inner surface 42 also has an annular groove 124 for receiving elastomeric sealing ring 128 and an annular groove 126 for receiving an elastomeric sealing ring 130. Ports 122 extends from the outer surface 104 to the inner surface 106 of the coupling box 100 for receiving pressure fittings that are adapted to be connected to quick connect hose couplings for pressure testing. The coupling box 100 has an annular upper edge surface 129.

Referring specifically to FIG. 21, the nut 102 has a vertical third annular outer surface 131 and a third annular out inner surface 132. The third inner surface 132 defines a third circular bore 134 which has an upper opening 136 and a lower opening 138. The lower end of the third outer surface 131 has external threads 140. An annular protuberance 142 extends outwardly from the third outer surface 131 above the threads 140. The protuberance 142 has a downwardly facing annular horizontal surface 144 just above the threads 140. The lower end of the third inner surface 132 has a tapered portion 146 which tapers outwardly toward the bottom opening 138.

Figure 22:
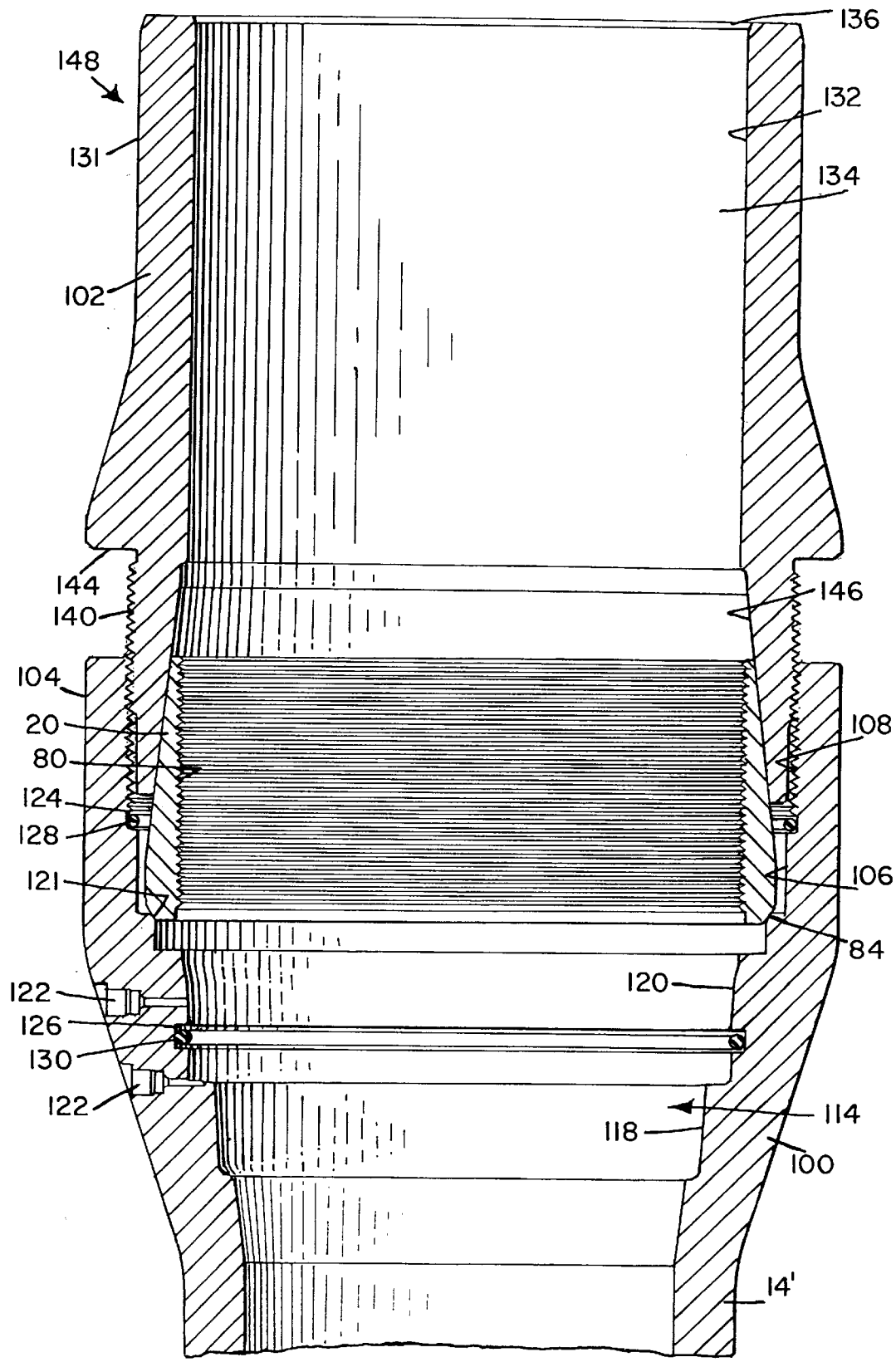
FIG. 22 is a vertical cross-sectional view of the coupling b ox assembly for the embodiment of FIG. 19.

Referring to FIG. 22, the flow line coupling 98 is made up by first positioning the split ring 20 within the bore 134 of the coupling box 100 so that the outwardly facing cam surface 84 of the split ring rest against the inwardly facing cam surface 121 of the coupling box. The nut 102 is applied to the coupling box 100 by inserting the lower end of the nut between the split ring 20 and the upper end of the coupling box and threading the nut 102 onto the coupling box until the tapered surface 146 of the nut engages the tapered surface 82 of the split ring 20 as shown in FIG. 22. When the coupling box 100, split ring 20, and nut 102 are assembled as shown in FIG. 22, they define a coupling box assembly, generally indicated by the reference numeral 148. At this point, the nut 102 lies in its upper loosening position and the coupling box assembly 148 is ready to receive the lower portion or pin 116 of the upper fluid pipe 12. The pin 16 is inserted into the third circular bore of the nut 102 and through the split ring 20 so that the lower end of the pin lies within the small diameter portion 114 of the coupling box. The nut 102 is tightened on the coupling box 100 to move the nut downwardly relative to the coupling box from its upper loosening position shown in FIG. 22 to its lower tightening position shown in FIG. 19. The downward movement of the lower end of the nut 102 forces the split ring 20 slightly downwardly and inwardly due to the wedging action between the tapered surfaces 82 and 146. The annular cam surface 121 provides resistance against the downward movement of the split ring 20 and enables the split ring to be constricted by the lower end of the nut 102. This causes the inwardly facing gripping teeth 80 to move inwardly into gripping engagement with the outwardly facing gripping teeth 38 of the pin 16. Subsequent tightening of the nut 102 causes the split ring 20 to move downwardly an additional amount and also causes the pin 16 to move downwardly due to the locking engagement between the gripping surfaces 80 and 38. The narrowed section 123 of the large diameter bore portion 114 of the coupling box ensures that the gripping piece 38 and 80 remain in engagement during the downward movement of the split ring 20. Eventually the annular tapered portions 40 and 41 of the pin 16 engages annular tapered portions 118, respectively, of the inner surface of the coupling box 100 to form a metal to metal double seal between the pin 16 of the pipe 12 and the coupling box 100 which forms the other portion of the pipe 14'. At this point the downwardly facing annular surface 144 of the nut 102 is at or very close to the upper end surface 129 of the coupling box 100 to prevent the nut from being tightened any further than what is required to achieve a metal to metal seal between the pin 16 and the coupling box 100.

A flow line coupling 98 is uncoupled by reversing the assembling procedure described above.

The pressure fitting ports 122 are vertically spaced and the elastomeric seal is located between the ports 122 and also between the metal to metal sealing areas. This arrangement enables the metal to metal sealing areas to be independently tested and verified.

Figure 23:
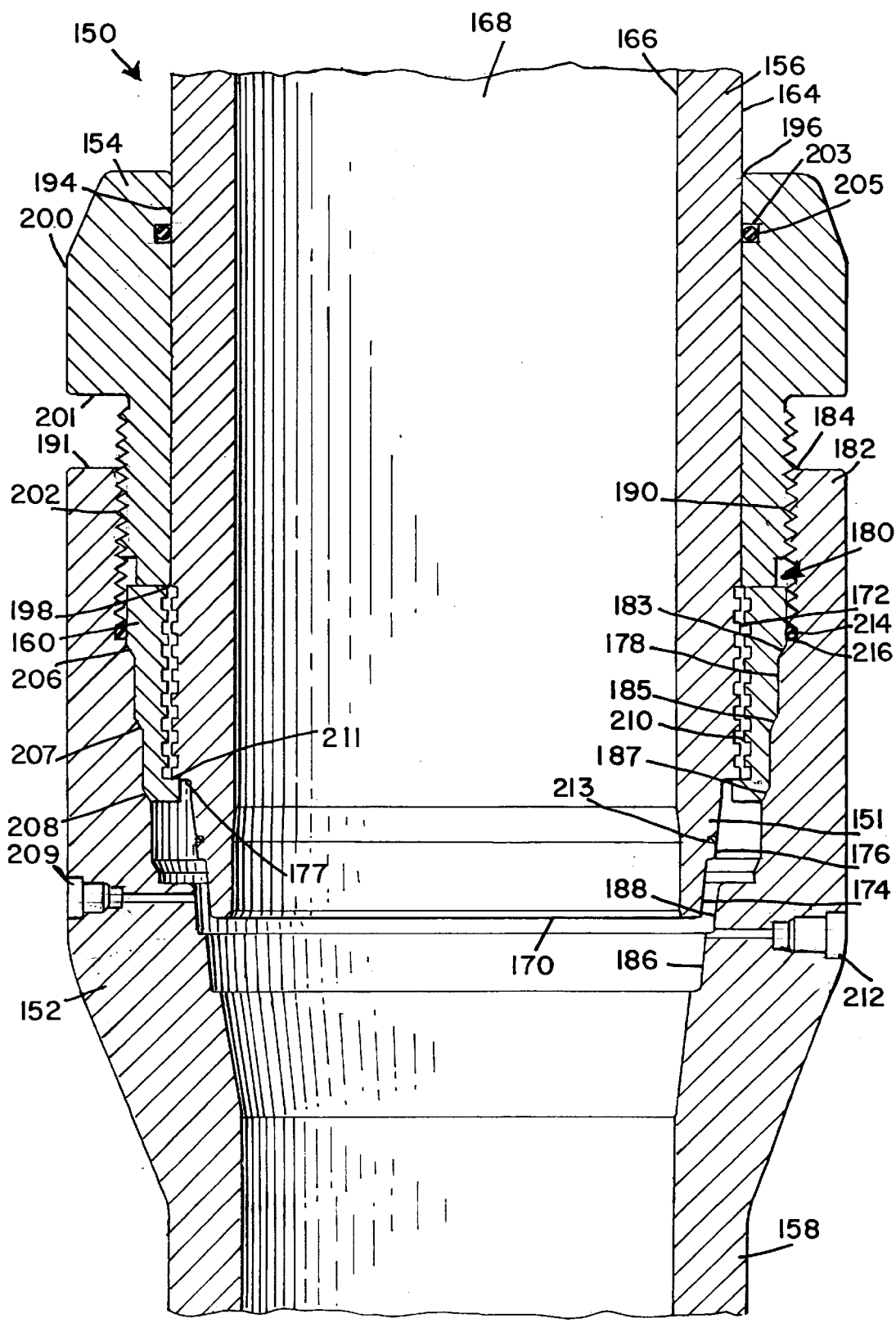
FIG. 23 is a vertical cross-sectional view of a third embodiment of a flow line coupling prior to tightening of the nut.
Figure 24:
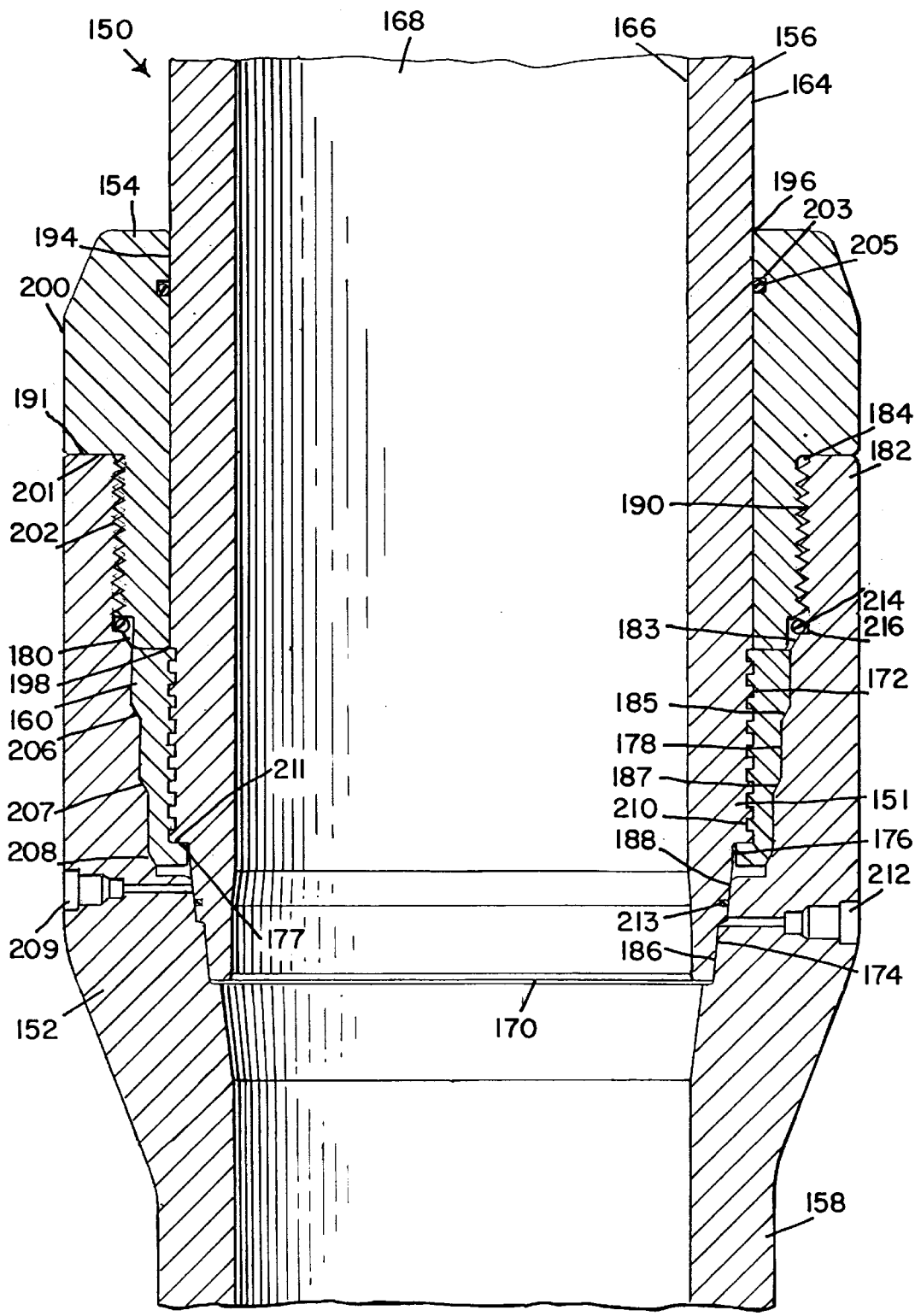
FIG. 24 is a view similar to FIG. 23 showing the coupling after tightening of the nut.
Figure 25:
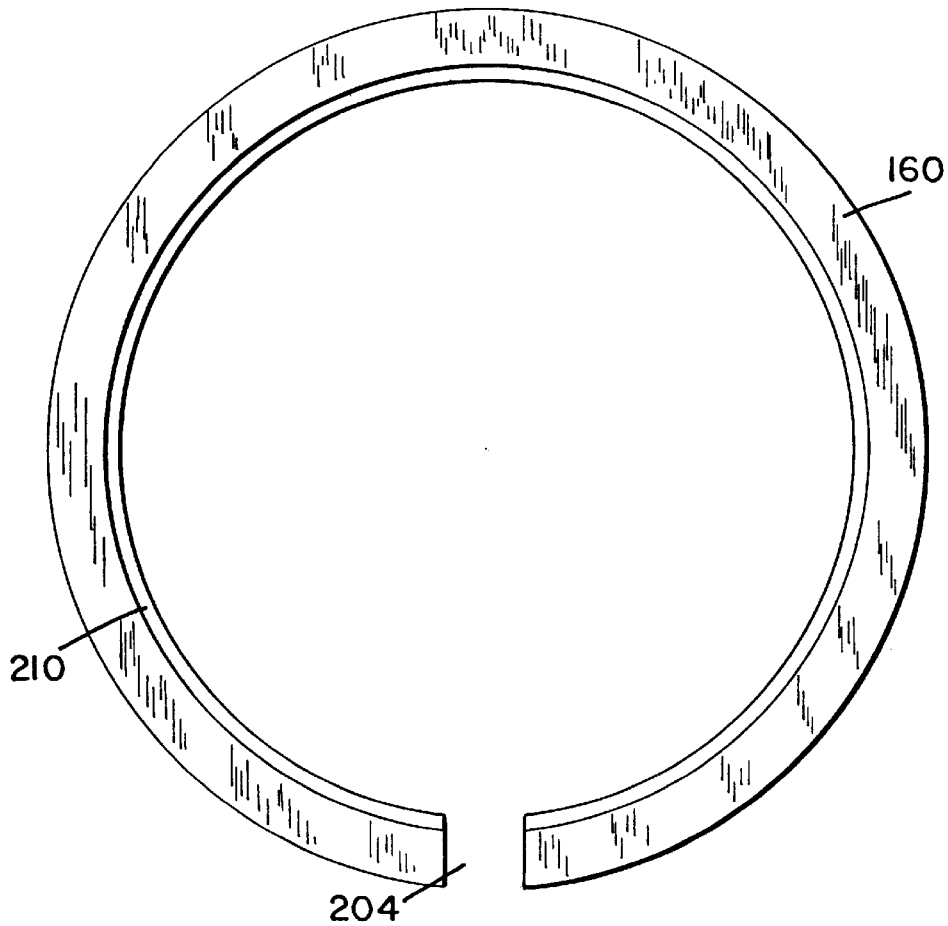
FIG. 25 is a plan view of the split ring portion of the third embodiment.
Figure 26:
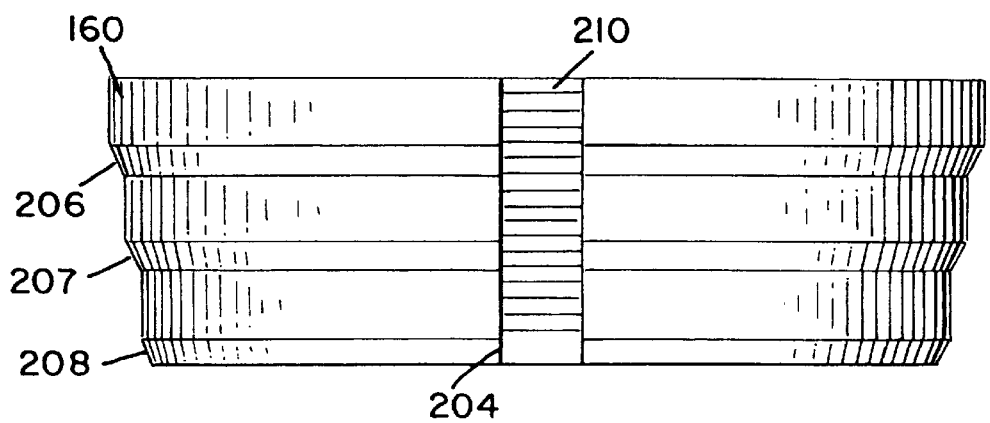
FIG. 26 is a front elevational view of the split ring of FIG. 25.

Referring to FIGS. 23 and 24, there is shown a third embodiment of a flow line coupling, generally indicated by the reference numeral 150 and is shown operatively connecting an upper fluid pipe 156 to a lower fluid pipe 158. The flow line coupling 150 includes a "pin" 151 at the lower end of the pipe 156 and which is an integral part of the pipe. The flow line coupling also includes a coupling box 152 at the upper end of the lower pipe 158 which is an integral portion of the pipe 158, a nut 154 and a split ring 160. The pipe 156 has a first outer surface 164, a first cylindrical inner surface 166, a first vertical bore 168 and a bottom opening 170 to the first bore 168. The first outer surface 164 has a plurality of outwardly facing gripping teeth 172. The outer surface 164 or the lower one end of the pipe 156 at the pin 151 has a first primary tapered portion 174 and a first secondary tapered portion 176. The outer surface of the pin 151 has a downwardly facing annular surface or shoulder 175 between the gripping teeth 172 and the first tapered portion 176.

The coupling box 152 has a second inner surface 178 and a second bore 180 and a top opening 184 to the bore 180 at the upper end 182 of the coupling box. The inner surface 178 of the coupling box has internal threads 190 at the upper end 182 of the coupling box adjacent the top opening 184. The lower end of the second inner surface 178 has a profile which is complementary with the outer profile of the pin 151 and comprises a second primary tapered portion 186 and a second secondary tapered portion 188. The second inner surface 178 also has a plurality of vertically spaced inwardly facing cam surfaces 183, 185, and 187 located between the internal threads 190 and the tapered surface portions 186 and 188. The coupling box 152 has an annular upper edge surface 191.

The nut 154 has a third inner surface 192 which defines a third circular bore 194 having an opening 196 at the upper end of the bore and a lower opening 198 at the lower end of the bore. The nut 154 also has a third outer surface 200 which contains outer threads 202 at the lower end of the nut for engaging the internal threads 190 of the coupling box 152. The nut 154 has a downwardly facing annular surface or shoulder 201 just above the threads 202. The inner surface 192 has an annular groove 203 near the top opening 196 for receiving an elastomeric sealing ring 205.

Referring to FIGS. 23–26, the split ring 160 has a vertical slot 204 which extends entirely through the split ring and a plurality of vertically spaced outwardly facing cam surfaces 206, 207, and 208 which are complimentary with the cam surfaces 183, 185, and 187, respectively of the coupling box 152. The inner surface of the split ring has a plurality of inwardly facing gripping teeth 210 which are complimentary with the outwardly facing gripping teeth 172 of the lower portion of the pipe 156 or pin 151. The lower end of the split ring 160 has an annular flange 211 which extends inwardly beyond the gripping teeth 210.

The flow line coupling 150 is assembled by first positioning the split ring 160 within the bore 180 of the coupling box so that the outwardly facing cam surfaces 206, 207, and 208 are engaged with the inwardly facing cam surfaces 183, 185, and 187, respectively. The lower end of the nut 154 is inserted into the second bore 180 through the top opening 184 so that the outer threads 202 of the nut engage the inner threads 190 of the coupling box. The lower "pin" end 151 of the pipe 156 is inserted through the bore 194 of the nut 154 and through the split ring 160 until the annular downwardly facing surface 177 of the pin 151 engages the inwardly facing annular flange 211 of the split ring 160. When the surface 177 rests on the flange 211, the gripping teeth 172 and 183 are spaced but horizontally aligned as shown in FIG. 23. Also, the first primary and secondary tapered surface portions 174 and 176 of the pipe 156 are spaced from and located above the second primary and secondary tapered portions 186 and 188 of the inner surface of the coupling box. The nut 154 is rotated so that it advanced toward the coupling box 152 until the lower edge of the nut engages the upper edge of the split ring 160. Additional turning of the nut 154 causes the lower end of the nut to force the split ring 160 downwardly. Downward movement of the split ring 160 causes the split ring to contract due to the engagement of its cam surfaces 206, 207, and 208 against the cam surfaces 183, 185, and 187 respectively. The constriction of the split ring 160 causes the ripping teeth 210 of the split ring to engage the gripping teeth 172 of the pipe 156. Additional tightening of the nut 154 toward the coupling box 152 forces the pipe 156 downwardly. When the annular surface 201 of the nut 154 is at or near the annular upper end surface 191 of the coupling box, the first and secondary tapered portions 174, and 176, respectively, of the outer surface of the pipe 156 engage the second primary and secondary tapered portions 186 and 188, respectively of the coupling box 152. This forms a tight metal to metal double seal between the pin portion 151 of the pipe 156 and the coupling box 152 which is an integral upper portion of the pipe 158. The flow line coupling 150 is uncoupled by reversing the assembling procedure described above. As in the case of previous embodiments, the coupling box 152 is provided with upper and lower ports 209 and 212, respectively, for receiving pressure fittings for testing the effectiveness of the metal to metal seal between the pin 151 and the coupling box 152. The first secondary tapered portion 176 of the pin 151 has an annular groove which contains an elastomeric sealing ring 213 which is located between the upper and lower ports 209 and 212, respectively. An elastomeric sealing ring 214 is located in an annular groove 216 in the inner surface of the coupling box 152 below the threads 190.

Clearly minor changes may be made in the form and construction of this invention without departing from the material spirit thereof. Therefore, it is not desired to confine the invention to the exact form shown herein and described, but it is desired to include all subject matter that properly comes within the scope claimed.

The invention having been thus described, what is claimed as new and desired to secure by letters patent is:

1. A flow line coupling assembly comprising:
   (a) a pipe having a lower end, a central vertical longitudinal axis, a vertical first outer surface, a vertical generally cylindrical first inner surface which defines a first vertical bore, and a bottom opening to said first vertical bore at the lower end of said pipe, said first outer surface having outwardly facing gripping teeth spaced from said bottom opening, a portion of said first outer surface between said bottom opening and said gripping teeth being tapered inwardly toward said bottom opening and constituting a first tapered portion;
   (b) a coupling box having an annular vertical second inner surface which defines a second bore, and an upper end which has a top opening to said second bore for receiving the lower end of said pipe, said second bore having a small diameter portion spaced from said top opening and a large diameter portion relative to said small diameter portion between said small diameter portion and said top opening, at least a portion of said second inner surface at the small diameter portion of said second bore being a second tapered portion which is tapered outwardly toward said top opening so that when the lower end of said pipe is inserted into said second bore through said top opening, said first tapered portion engages said second tapered portion, said coupling box having a vertical cylindrical second outer surface, one of said second inner surface and said second outer surface having threads adjacent said top opening;
   (c) a nut having a vertical third inner surface which defines a circular third bore, an upper opening to said third bore, and a lower opening to said third bore, said pipe being located within said third bore and the lower end of said pipe extending below the lower opening to said third bore for engaging said coupling box, said nut having a vertical cylindrical third outer surface, one of said third inner surface and said third outer surface having threads for engaging the threads of said coupling box so that turning of said nut about said vertical longitudinal axis causes said nut to move along said vertical longitudinal axis, between an upper loosening position and a lower tightening position; and
   (d) an engager located between said coupling box and said pipe, said engager having a vertical inwardly facing gripping surface which has inwardly facing gripping teeth, said engager being adapted for inward and downward movement from an upper neutral position in which said inwardly facing gripping teeth are horizontally aligned with and spaced from said outwardly facing gripping teeth to a lower driving position in which said inwardly facing gripping teeth are in engagement with said outwardly facing gripping teeth, said engager being operatively connected to said nut so that said engager is in its neutral position when said nut is in its loosening position and so that when said nut is moved from its upper loosening position to its lower tightening position, the downward movement of said nut relative to said coupling box causes said engager to move inwardly and downwardly from its neutral position so that said inwardly facing gripping teeth engage said outwardly facing gripping teeth and said pipe is forced downwardly relative to said coupling box to force said first tapered portion into downward sliding engagement with said second tapered portion to form a tight seal between the first tapered portion of said pipe and the second tapered portion of said coupling box.

2. A flow line coupling assembly as recited in claim 1, wherein the first tapered portion of said first outer surface is a first primary tapered portion and the second tapered portion of said second inner surface is a second primary tapered portion so that when said first primary portion engages said second primary portion, a primary seal is formed between said pipe and said coupling box and, wherein said first outer surface has a first secondary tapered portion between said first primary tapered portion and said outwardly facing gripping teeth and said second inner surface has a second secondary tapered portion between said second primary tapered potion and said top opening, said first secondary tapered portion tapering inwardly toward said bottom opening and said second secondary tapered portion tapering outwardly toward said top opening so that said first secondary tapered portion engages said second secondary tapered portion when the lower end of said pipe is inserted into said coupling assembly to form a secondary seal between said pipe and said coupling box.

3. A flow line coupling assembly as recited in claim 2, wherein said first and second primary tapered portions are closer to said central vertical axis than said first and second secondary tapered portions.

4. A flow line coupling assembly as recited in claim 1, wherein said engager is a split ring, said split ring having an upper end, a lower end, and a fourth inner surface which defines a fourth bore and which has said inwardly facing gripping teeth, said split ring having an outer engaging surface which tapers inwardly toward the upper end of said split ring, said split ring having a vertical slot which extends along the entire vertical length of said split ring, said split ring being made of a material which is sufficiently resiliently flexible, said nut being operatively connected to said outer engaging surface for compressing said split ring as said nut is tightened so that said inwardly facing gripping teeth are brought into gripping engagement with said outwardly facing gripping teeth and the lower end of said pipe is forced into sealing contact with said coupling box as said nut is tightened.

5. A flow line coupling assembly as recited in claim 4, wherein said nut is effective to move said split ring downwardly as said nut is tightened and wherein the inner surface of said coupling box has an inwardly facing cam surface portion between the large diameter portion and the small diameter portion of said second bore and said split ring has an outwardly facing can surface at the lower end of said split ring for engaging said inwardly facing cam surface portion and forcing said split ring inwardly as said nut is tightened so that said inwardly facing gripping teeth engage said outwardly facing gripping teeth, each of said inwardly facing cam surface portion and said outwardly facing cam surface tapering outwardly toward said top opening.

6. A flow line coupling assembly as recited in claim 5, wherein said first and second primary tapered portions are closer to said central vertical axis than said first and second secondary tapered portions.

7. A flow line coupling assembly as recited in claim 5, wherein the first tapered portion of said first outer surface is a first primary tapered portion and the second tapered portion of said second inner surface is a second primary tapered portion so that when said primary tapered portion engages said second primary tapered portion, a primary seal is formed between said pipe and said coupling box and, wherein said first outer surface has a first secondary tapered portion between said first primary tapered portion and said outwardly facing gripping teeth and said second inner surface has a second secondary tapered portion between said second primary tapered potion and said top opening, said first secondary tapered portion tapering inwardly toward said bottom opening and said second secondary tapered portion tapering outwardly toward said top opening so that said first secondary tapered portion engages said second secondary tapered portion when the lower end of said pipe is inserted into said coupling assembly to form a secondary seal between said pipe and said coupling box.

8. A flow line coupling assembly as recited in claim 1, wherein said coupling box has at least one port which extends from the second outer surface to the second inner surface of said coupling box at the tapered portion of said second inner surface, said port being adapted to receive a pressure fitting for pressure testing of said coupling.

9. A flow line coupling assembly as recited in claim 1, wherein the large diameter portion of said second bore has a first inwardly facing cam surface which tapers outwardly toward said top opening and wherein said engager is a split ring, which has an upper end, a lower end, and a fourth inner surface which defines a fourth bore and which has inwardly facing gripping teeth, said split ring having an outwardly facing cam surface which tapers outwardly toward the upper end of said split ring and which is in engagement with said inwardly facing cam surface, said split ring having a vertical slot which extends along the entire vertical length of said split ring, said split ring being made of a material which is resiliently flexible so that said split ring is compressible by the application of an external force to said split ring to reduce the width of said vertical slot and to cause said inwardly facing gripping teeth to move inwardly toward said outwardly facing gripping teeth, said split ring being operatively connected to said nut so that said split ring is moved downwardly as said nut is tightened to cause relative movement between said outwardly facing cam surface and said inwardly facing cam surface and to cause said split ring to compress so that said inwardly facing gripping teeth are brought into gripping engagement with said outwardly facing gripping teeth, thereby causing said pipe to be moved downwardly as said nut is tightened and causing the first tapered portion of said pipe to be brought into sealing engagement with the second tapered portion of coupling box.

10. A flow line coupling assembly as recited in claim 9, wherein said inwardly facing cam surface has a plurality of vertically spaced cam surface portions and said outwardly facing cam surface has a plurality of vertically spaced cam surface portions which are in engagement with the cam surface portions of said inwardly facing cam surface, each successive one of said cam surface portions from an uppermost cam surface portion to a lowermost cam surface portion being closer to said inwardly facing gripping teeth.

11. A flow line coupling assembly comprising:

(a) a pipe having a lower end, a central vertical longitudinal axis, a vertical first outer surface, a vertical generally cylindrical first inner surface which defines a first vertical bore, and a bottom opening to said first vertical bore at the lower end of said pipe, said first outer surface having outwardly facing gripping teeth spaced from said bottom opening, a portion of said first outer surface between said bottom opening and said gripping teeth being tapered inwardly toward said bottom opening and constituting a first tapered portion;

(b) a coupling box having an annular vertical second inner surface which defines a second bore, and an upper end which has a top opening to said second bore for receiving the lower end of said pipe, said second bore having a small diameter portion spaced from said top opening and a large diameter portion relative to said small diameter portion between said small diameter portion and said top opening, at least a portion of said second inner surface at the small diameter portion of said second bore being a second tapered portion which is tapered outwardly toward said top opening so that when the lower end of said pipe is inserted into said second bore through said top opening, said first tapered portion engages said second tapered portion, said coupling box having a vertical cylindrical second outer surface which has external threads adjacent said top opening;

(c) a nut having a vertical third inner surface which defines a circular third bore, an upper opening to said third bore, and a lower opening to said third bore, said third bore having a large diameter portion adjacent said lower opening, a small diameter portion relative to said large diameter portion adjacent said upper opening and an intermediate diameter portion relative to said large and small diameter portions between said large diameter portion and said small diameter portion, said third inner surface having internal threads at the large diameter portion of said third bore for engaging the external threads of said coupling box when the upper end of said coupling box is inserted into the large diameter portion of said third bore through said lower opening, so that turning of said nut about said vertical longitudinal axis causes said nut to move along said vertical longitudinal axis, said nut having a downwardly facing annular surface between the large and small diameter portions of said third bore, the intermediate portion of said third bore being vertically aligned with the large diameter portion of said second bore when said nut is threaded onto said coupling box;

(d) a split ring which is adapted to be located between said coupling box and said pipe in the large diameter portion of said second bore and the intermediate diameter portion of said third bore when said nut is threaded onto said coupling box, said split ring having an upper end, a lower end, and a fourth inner surface which defines a fourth bore and which has an inwardly facing gripping surface which has inwardly facing gripping teeth, said split ring having an outer engaging surface which tapers outwardly toward the upper end of said split ring, said split ring having a vertical slot which extends along the entire vertical length of said split ring, said split ring being made of a material which is sufficiently resiliently flexible so that said split ring is compressible by the application of an external force to said split ring to reduce the width of said vertical slot and to cause said inwardly facing gripping teeth to move inwardly toward said outwardly facing gripping teeth; and (e) an actuating ring which is adapted to be located between said split ring and said coupling box, said actuating ring having an upper end which has an upwardly facing end surface and a lower end, said actuating ring having an inner engaging surface which tapers outwardly toward the lower end of said actuating ring for engaging said outer engaging surface, said split ring, said actuating ring, said nut and said coupling box forming a coupling assembly so that said upwardly facing end surface engages said downwardly facing surface and said outwardly facing gripping teeth are spaced from and horizontally aligned with said outwardly facing gripping teeth when said pipe is applied to said coupling assembly by insertion of the lower end of said pipe into said second and third bores and so that when said nut is tightened onto said coupling box to cause downward movement of said nut relative to said coupling box said actuating ring is caused to move downwardly and compressing said split ring so that said inwardly facing gripping teeth are brought into griping engagement with said outwardly facing gripping teeth and said pipe is forced downwardly relative to said coupling box to force said first tapered portion into sealing engagement with said second tapered portion to form a tight seal between said pipe and said coupling box.

12. A flow line coupling assembly as recited in claim 11, wherein the inner surface of said coupling box has an inwardly facing cam surface portion between the large diameter portion and the small diameter portion of said second bore and said split ring has an outwardly facing cam surface at the lower end of said split ring for engaging said inwardly facing cam surface portion, each of said inwardly facing cam surface portion and said outwardly facing cam surface tapering outwardly toward said top opening.

13. A flow line coupling assembly as recited in claim 11, wherein the first tapered portion of said first outer surface is a first primary tapered portion and the second tapered portion of said second inner surface is a second primary tapered portion so that when said first primary tapered portion engages said second primary tapered portion, a seal is formed between said pipe and said coupling box and, wherein said first outer surface has a first secondary tapered portion between said first primary tapered portion and said outwardly facing gripping teeth and said second inner surface has a second secondary tapered portion between said second primary tapered portion and said top opening, said first secondary tapered portion tapering inwardly toward said bottom opening and said second secondary tapered portion tapering outwardly toward said top opening so that said first secondary tapered portion engages said second secondary tapered portion when the lower end of said pipe is inserted into said coupling assembly to form a secondary tight seal between said pipe and said coupling box.

14. A flow line coupling assembly as recited in claim 13, wherein said first and second primary tapered portions are closer to said central vertical axis than said first and second secondary tapered portions.

15. A flow line coupling assembly as recited in claim 11, wherein said coupling box has at least one port which extends from the second outer surface to the second inner surface of said coupling box at the tapered portion of said second inner surface, said port being adapted to receive a pressure fitting for pressure testing of said coupling.

16. A flow line coupling assembly as recited in claim 11, wherein said split ring has a stop for engaging the lower end of said pipe to limit the downward movement of said pipe relative to said split ring within said split ring so that said outwardly facing gripping teeth are horizontally aligned with said inwardly facing gripping teeth and said first tapered portion is engaged with said second tapered portion.

* * * * *